(12) United States Patent
Hachiro

(10) Patent No.: US 8,947,726 B2
(45) Date of Patent: Feb. 3, 2015

(54) METHOD FOR IMAGE-DISPLAY

(75) Inventor: Shigeki Hachiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 792 days.

(21) Appl. No.: 12/277,501

(22) Filed: Nov. 25, 2008

(65) Prior Publication Data

US 2009/0141315 A1 Jun. 4, 2009

(30) Foreign Application Priority Data

Nov. 30, 2007 (JP) .................................. 2007-309705

(51) Int. Cl.
*H04N 1/60* (2006.01)
*H04N 1/46* (2006.01)
*G09G 5/00* (2006.01)
*G06K 9/68* (2006.01)
*G06F 3/0483* (2013.01)
*G06F 3/0482* (2013.01)

(52) U.S. Cl.
CPC ............ *G06F 3/0483* (2013.01); *G06F 3/0482* (2013.01)
USPC ............ 358/1.9; 358/539; 358/540; 345/661; 345/676; 382/227

(58) Field of Classification Search
USPC ........... 358/1.9, 537, 538, 540, 539; 345/661, 345/676, 440.2, 205, 35, 593; 382/203, 382/224, 226, 227
See application file for complete search history.

(56) References Cited

U.S. PATENT DOCUMENTS

| 5,524,065 | A | * | 6/1996 | Yagasaki | 382/226 |
| 5,754,694 | A | * | 5/1998 | Villalba | 382/226 |
| 5,901,255 | A | * | 5/1999 | Yagasaki | 382/310 |
| 5,982,933 | A | * | 11/1999 | Yoshii et al. | 382/226 |
| 6,245,982 | B1 | * | 6/2001 | Suzuki et al. | 84/477 R |
| 6,574,629 | B1 | * | 6/2003 | Cooke et al. | 1/1 |
| 7,271,930 | B2 | * | 9/2007 | Ito et al. | 358/1.16 |
| 7,304,754 | B1 | | 12/2007 | Nakamura et al. | |
| 7,346,270 | B2 | * | 3/2008 | Yoshio et al. | 386/248 |
| 7,586,524 | B2 | * | 9/2009 | Tsue et al. | 348/231.2 |
| 7,706,617 | B2 | * | 4/2010 | Cahill et al. | 382/224 |
| 7,729,013 | B2 | * | 6/2010 | Nishida | 358/2.1 |
| 7,757,253 | B2 | * | 7/2010 | Rappaport et al. | 725/41 |
| 7,783,115 | B2 | * | 8/2010 | Matsui et al. | 382/227 |
| 7,847,850 | B2 | * | 12/2010 | Takagi et al. | 348/333.02 |
| 7,860,320 | B2 | * | 12/2010 | Luo et al. | 382/227 |
| 7,903,282 | B2 | * | 3/2011 | Furukawa et al. | 358/1.9 |
| 7,961,242 | B2 | * | 6/2011 | Yumiki | 348/333.12 |
| 7,970,240 | B1 | * | 6/2011 | Chao et al. | 382/305 |

(Continued)

FOREIGN PATENT DOCUMENTS

| EP | 1098254 A3 | 5/2004 |
| JP | 09-006791 A | 1/1997 |

(Continued)

*Primary Examiner* — Madelein A Nguyen
(74) *Attorney, Agent, or Firm* — Canon USA Inc. IP Division

(57) ABSTRACT

A screen image displaying image-data items in list form is displayed over a predetermined time period. Then, the display color of an image-data item of the image-data items, the image-data item corresponding to predetermined classification information, is changed so that the image-data item can be differentiated from other image-data items. Consequently, a user can clearly identify the classification of the image-data items and easily find an image-data item satisfying a condition without performing a complicated operation.

23 Claims, 20 Drawing Sheets

(56) References Cited

U.S. PATENT DOCUMENTS

| | | | |
|---|---|---|---|
| 7,987,429 B2* | 7/2011 | Hosoya | 715/762 |
| 8,466,875 B2* | 6/2013 | Nakada et al. | 345/157 |
| 8,638,292 B2* | 1/2014 | Kawakami et al. | 345/156 |
| 2002/0021841 A1* | 2/2002 | Yoshii | 382/226 |
| 2002/0024608 A1* | 2/2002 | Ejima et al. | 348/333.05 |
| 2002/0032696 A1* | 3/2002 | Takiguchi et al. | 707/500.1 |
| 2002/0122596 A1* | 9/2002 | Bradshaw | 382/226 |
| 2002/0159642 A1* | 10/2002 | Whitney | 382/225 |
| 2002/0176690 A1* | 11/2002 | Nagasawa | 386/52 |
| 2004/0125152 A1* | 7/2004 | Sommers et al. | 345/856 |
| 2004/0128317 A1* | 7/2004 | Sull et al. | 707/104.1 |
| 2004/0189827 A1* | 9/2004 | Kim et al. | 348/231.4 |
| 2004/0252878 A1* | 12/2004 | Okuda et al. | 382/145 |
| 2005/0013490 A1* | 1/2005 | Rinne et al. | 382/226 |
| 2005/0125276 A1* | 6/2005 | Rusu | 705/9 |
| 2005/0174591 A1* | 8/2005 | Sowinski et al. | 358/1.9 |
| 2005/0220349 A1* | 10/2005 | Furuya et al. | 382/195 |
| 2006/0107235 A1* | 5/2006 | Esaki et al. | 715/824 |
| 2006/0146167 A1* | 7/2006 | Aizawa et al. | 348/333.01 |
| 2006/0256410 A1* | 11/2006 | Koie et al. | 358/540 |
| 2007/0078873 A1* | 4/2007 | Avinash et al. | 707/101 |
| 2007/0094602 A1* | 4/2007 | Murabayashi | 715/723 |
| 2007/0130013 A1* | 6/2007 | Robert | 705/14 |
| 2007/0260994 A1* | 11/2007 | Sciammarella et al. | 715/769 |
| 2007/0268309 A1* | 11/2007 | Tanigawa et al. | 345/619 |
| 2008/0059895 A1* | 3/2008 | Hosoya | 715/762 |
| 2008/0129757 A1* | 6/2008 | Tanaka et al. | 345/660 |
| 2008/0271077 A1* | 10/2008 | Kim et al. | 725/39 |
| 2008/0316519 A1* | 12/2008 | Suzuki et al. | 358/1.13 |
| 2009/0016616 A1* | 1/2009 | Kasahara | 382/226 |
| 2009/0064029 A1* | 3/2009 | Corkran et al. | 715/781 |
| 2009/0201316 A1* | 8/2009 | Bhatt et al. | 345/660 |
| 2010/0128058 A1* | 5/2010 | Kawabata et al. | 345/593 |
| 2010/0220978 A1* | 9/2010 | Ogikubo | 386/95 |
| 2010/0295923 A1* | 11/2010 | Mihashi et al. | 348/43 |
| 2012/0069182 A1* | 3/2012 | Sumi et al. | 348/148 |
| 2012/0113325 A1* | 5/2012 | Kim et al. | 348/570 |
| 2013/0332884 A1* | 12/2013 | Hitosuga | 715/810 |

FOREIGN PATENT DOCUMENTS

| | | |
|---|---|---|
| JP | 2004-255740 | 9/2004 |
| JP | 2005-055743 A | 3/2005 |
| JP | 2007-299172 A | 11/2007 |

* cited by examiner

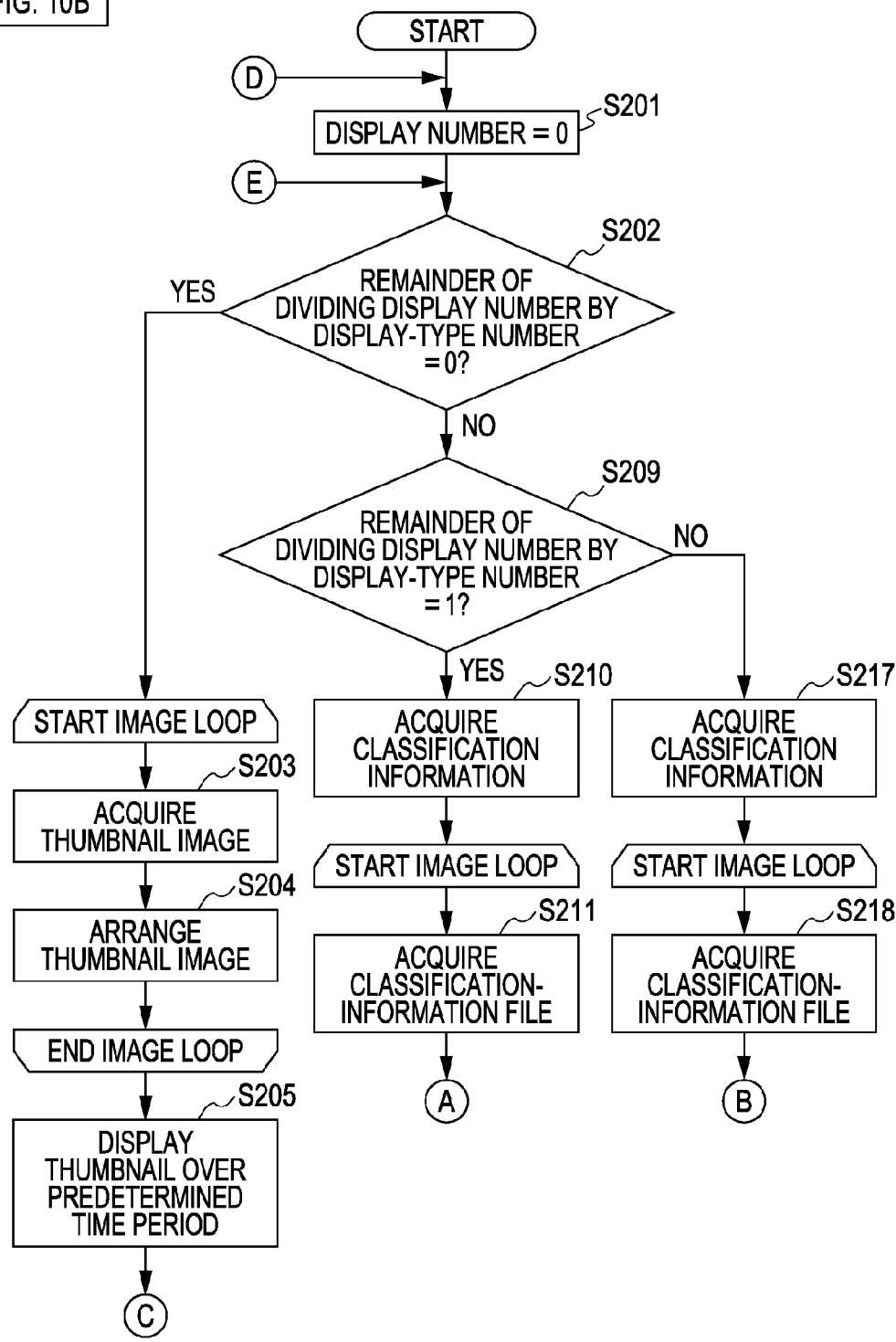

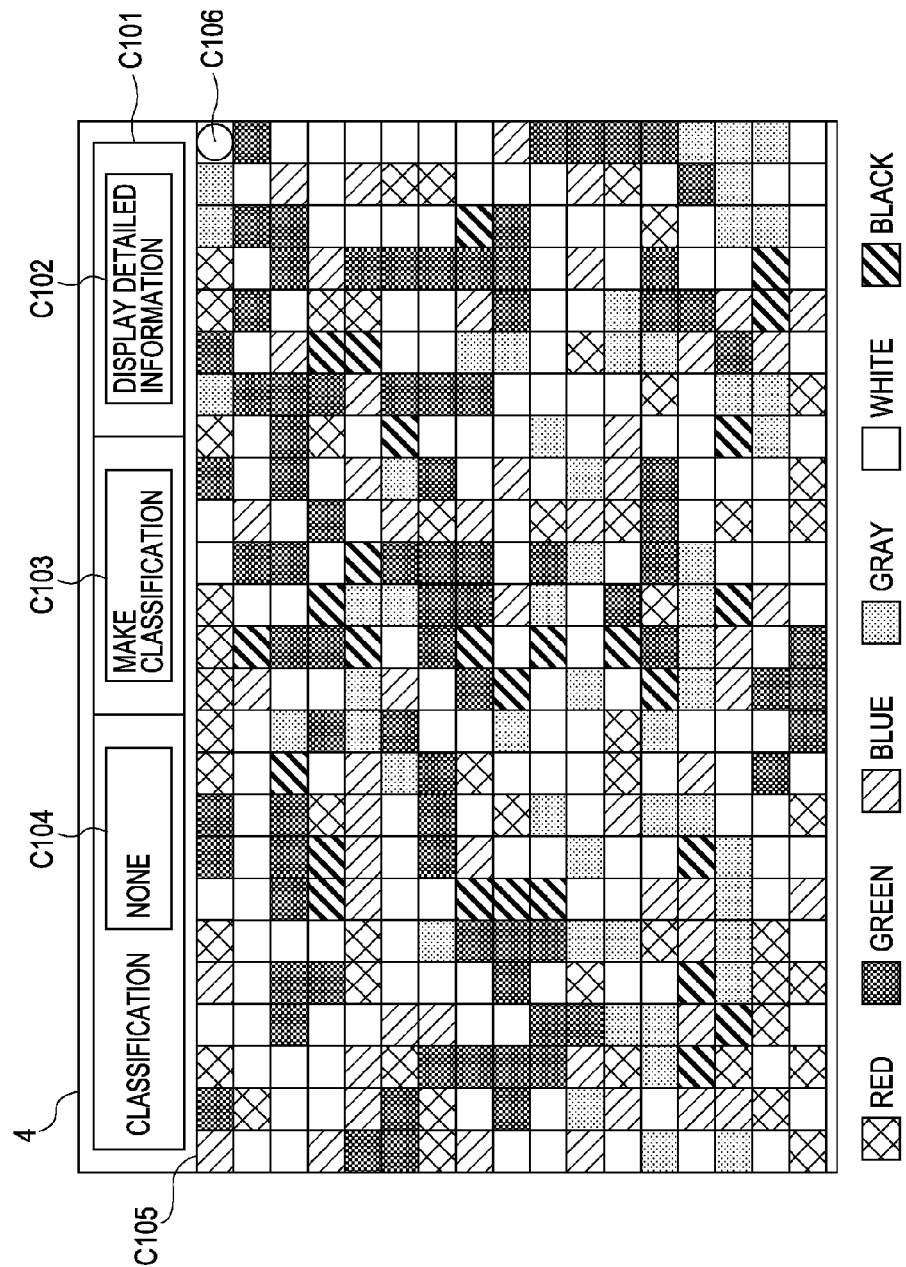

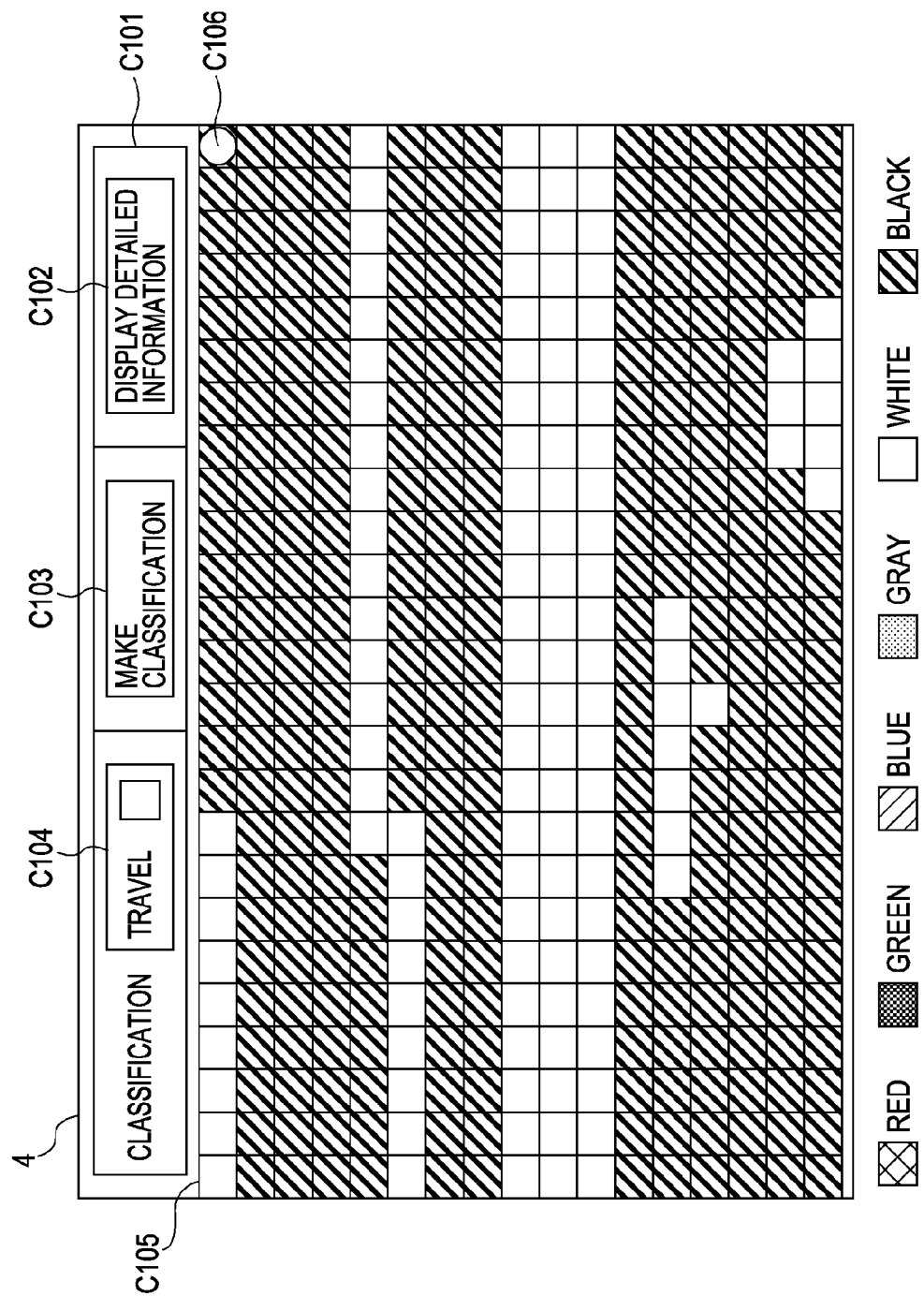

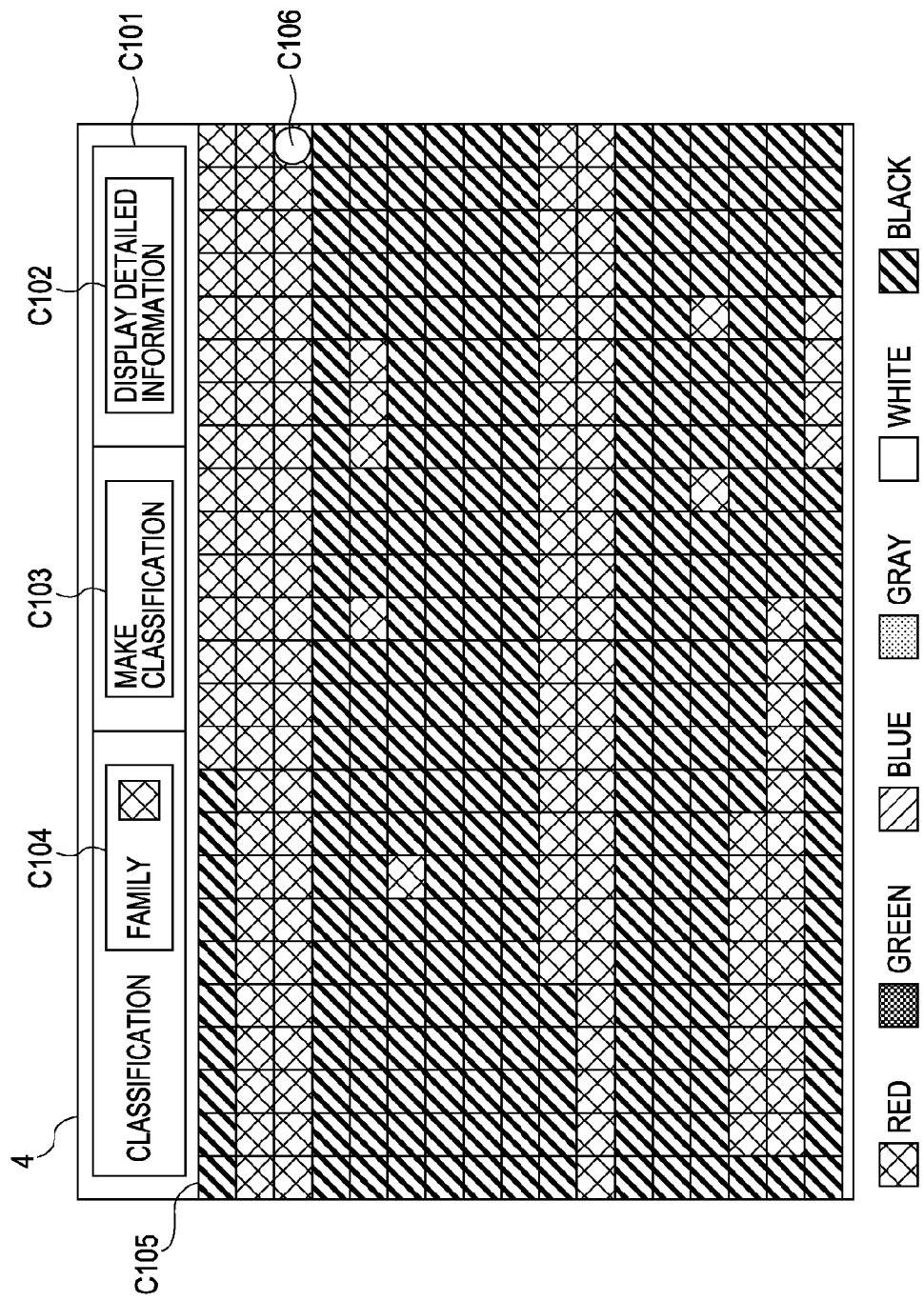

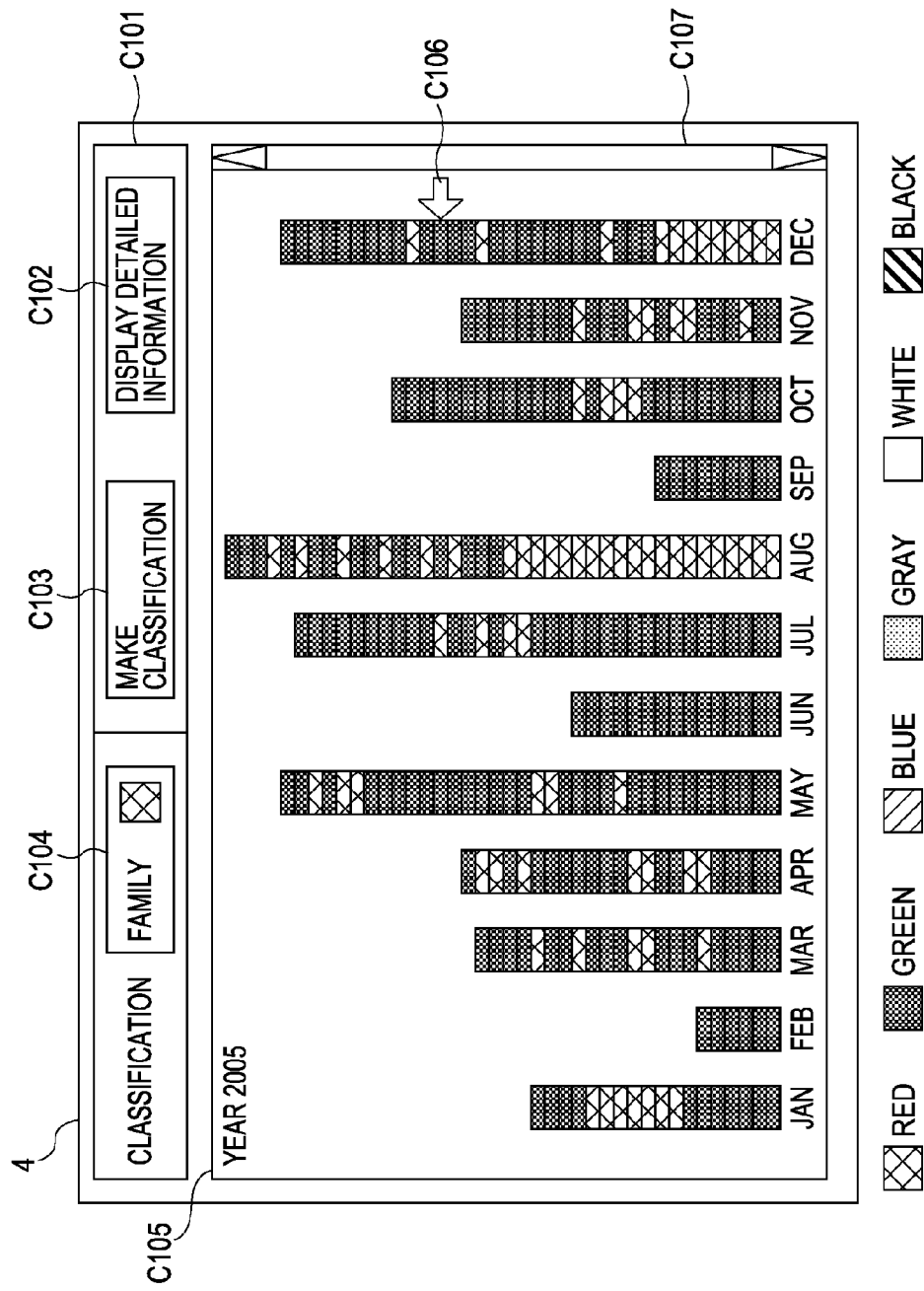

METHOD FOR IMAGE-DISPLAY

BACKGROUND OF THE INVENTION

1. Field of the Invention

The present invention relates to a method for image-display which makes it easy to search through massive image data for target image data.

2. Description of the Related Art

In recent years, apparatuses and/or devices configured to generate digital-image data, such as digital cameras and scanners have been widely available and massive digital image data is owned by an individual person. Consequently, demands for managing and retrieving the massive digital-image data have increased significantly, and several technologies associated therewith have become available.

For example, Europe Patent No. 1098254 discloses a system configured to graph and display the list of image-data items as a histogram or the like, which allows a user to search for desired data. According to the technology written in Europe Patent No. 1098254, data on the number of image-file-data items is displayed for each time-information item added to the image-file-data item as a bar chart. Further, according to the written technology, part of the bar chart is selected so that the image-file-data item corresponding to the area of the selected part is displayed as a thumbnail image with the date information of the image-file-data item.

Further, Japanese Patent Laid-Open No. 2004-255740 discloses the method of classifying image-data items based on a certain classification indicator (by date, by month, by folder, etc.) and displaying thumbnail images for each classified page. For example, if a user selects the indicator "by month", the image-data items are classified by month based on the date and the time when the image-file-data items were generated and displayed. Further, U.S. Pat. No. 7,304,754 discloses that the number of the pixels of image-file data is compared to the print size and the degree of the appropriateness of the image-file data for favorable printing is displayed by bordering the image-file data in different colors.

However, the above-described technology written in Europe Patent No. 1098254 merely allows for displaying how many image-file-data items corresponding to the generation date there are through the graph. Therefore, even though the above-described technology is useful to know how many image-file-data items corresponding to a predetermined date there are, it is difficult for the user to know what kind of image-file-data items exist by simply viewing the graph. Further, for finding desired image-file data, part of the bar chart should be selected, so as to shift to a screen image displaying the image-file data.

According to the technology written in Japanese Patent Laid-Open No. 2004-255740, image-file-data items satisfying a single search condition are displayed in list form. Namely, Japanese Patent Laid-Open No. 2004-255740 discloses no method for displaying image-file-data items satisfying at least two search conditions in list form. As shown in FIG. 11 illustrating Japanese Laid-Open No. 2004-255740, the above-described technology merely allows either displaying the image-file data corresponding to date-and-time information after specifying the date-and-time information as the search condition or displaying the file data corresponding to a specified file name.

According to the invention disclosed in U.S. Pat. No. 7,304,754, whether or not the image-file data is appropriate for image-file printing is displayed by bordering the image-file data with frames of different colors. Namely, the above-described invention does not allow for displaying image-file-data items satisfying the at least two search conditions in list form. Therefore, if many image-file-data items are displayed and bordered with frames of different colors, the display space of a display-screen image is decreased by as much as the above-described frames. Further, the above-described configuration gives the display-screen image a confused appearance.

SUMMARY OF THE INVENTION

Accordingly, the present invention has been achieved to provide a method that allows for easily searching through massive image data for a target image data.

According to an aspect of the present invention, a method for display-control is described below.

The method for display-control of an apparatus including a display part configured to display image data, an operation part configured to be operated by a user, and a mounting part configured to mount an external storage medium. The method includes an inputting step provided to input classification information indicating additional information of image data targeted for classification in accordance with an operation of the operation part, a reading step provided to read the image data and the additional information corresponding to the image data from the external storage medium mounted in the mounting part, a determining step provided to determine whether the additional information corresponding to the image data read at the reading step is the additional information indicated by the classification information input at the inputting step, a display-control step provided to display at least two image-data items read at the reading step on the display part in list form, and a changing step provided to change the display color of an image-data item based on the result of the determination made at the determining step of the at least two image-data items after a predetermined time elapses since the display is performed at the display-control step.

Further features and aspects of the present invention will become apparent from the following description of exemplary embodiments with reference to the attached drawings.

BRIEF DESCRIPTION OF THE DRAWINGS

FIG. 11 shows the icon images corresponding to image-file data in list form according to a second embodiment of the present invention.

FIG. 12 shows the pattern of displaying icon images relating to "travel".

FIG. 13 shows the pattern of displaying icon images relating to "family".

FIG. 19 shows icon images relating to "family" as a histogram.

DESCRIPTION OF THE EMBODIMENTS

First Embodiment

Hereinafter, embodiments of the present invention will be described with reference to the attached drawings.

Figure 1:
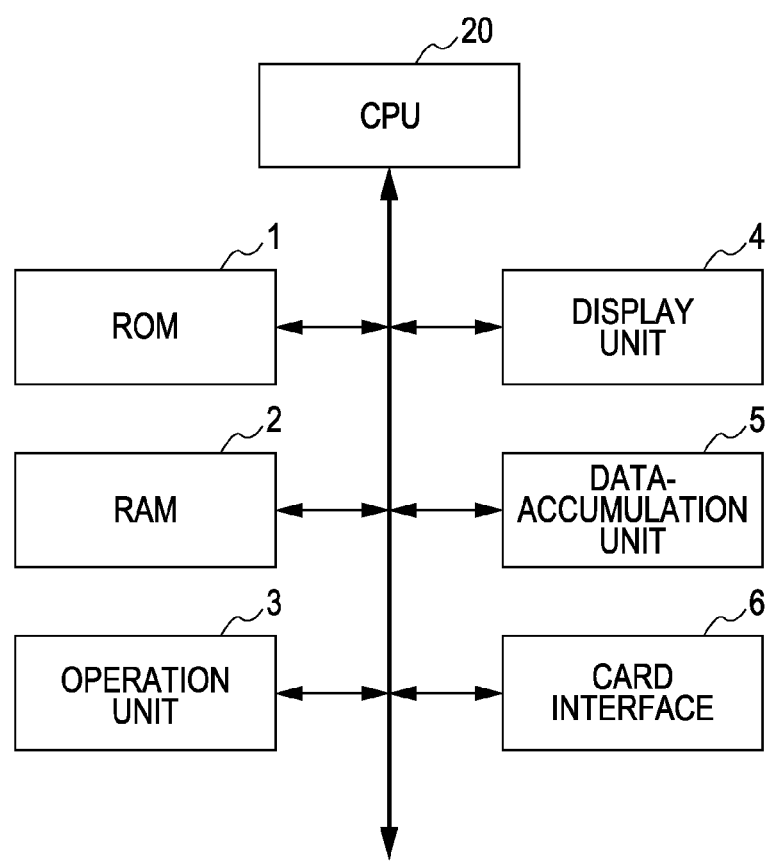
FIG. 1 is a block diagram showing the configuration of an image-display apparatus according to an embodiment of the present invention.

FIG. 1 is a block diagram showing an exemplary configuration of an image-display apparatus according to an embodiment of the present invention. The image-display apparatus includes a central-processing unit (CPU) 20, a read-only memory (ROM) 1, a random-access memory (RAM) 2, an operation part 3, a display part 4, a data-accumulation unit 5, and a card interface 6.

The CPU 20 controls various functions of the image-display apparatus and executes an image-processing program stored in the ROM 1 in accordance with a predetermined operation of the operation part 3. The ROM 1 stores, for example, a program provided to issue an instruction to control the image-display apparatus. The RAM 2 is a memory functioning as a temporary storage area and/or a work area used for image-file data and/or the control-instruction program stored in the ROM 1.

The card interface 6 reads, for example, image-file data that is captured by a digital-still camera and that is stored in a memory card or the like in accordance with the predetermined operation of the operation part 3. Although the card interface 6 is provided in the above-described embodiment, so as to read the image-file data from a memory card or the like, a universal serial bus (USB) interface, a network interface, and so forth may be used, so as to capture image data from an external device. Further, a scanner device may be used to optically capture image data.

The display part 4 includes a liquid-crystal display (LCD) of a dot-matrix type and an LCD driver, and displays various kinds of data under the control of the CPU 20. The data-accumulation unit 5 is a nonvolatile data-storage device configured as a hard disk drive (HDD), and accumulates and stores data under the control of the CPU 20. The above-described configuration of the image-display apparatus constitutes an embodiment of the present invention. However, the present invention may be used not only for display functions. Namely, the present invention may be used for a recording device such as an ink-jet printer, which makes it possible to print an image searched by a user after the list display is performed.

Figure 2:
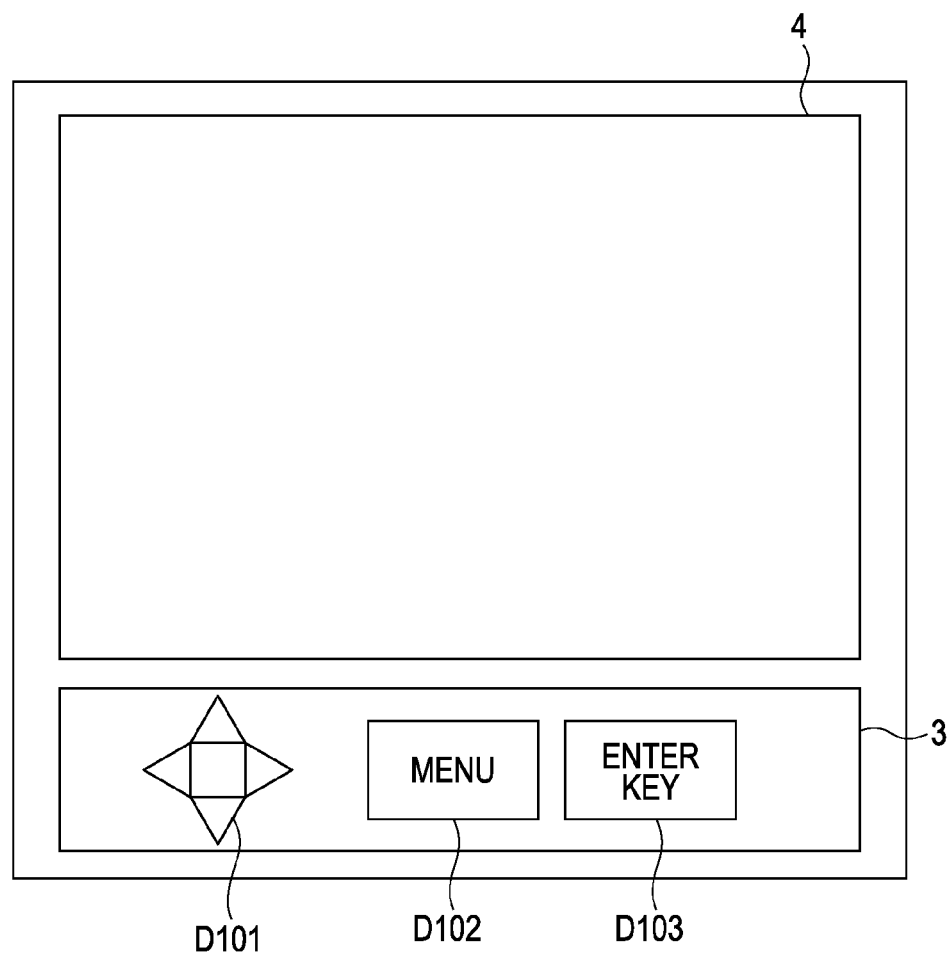
FIG. 2 shows a display part and an operation part of the image-display apparatus.

FIG. 2 shows the display part 4 and the operation part 3 of the image-display apparatus. The operation part 3 includes a cross key D101, a menu key D102, and an enter key D103. The cross key D101 is shaped, so as to be pressed in four directions including the vertical direction and the horizontal direction. The user operates the cross key D101, so as to move a cursor, for example. Further, the user operates the menu key D102, so as to display a menu, as will be described later. Further, the enter key D103 is provided to enter data of a selection made by the user. The display part 4 is provided to display various setting items in addition to the image-file data. Without being limited to the above-described embodiment, the arrangement, the names, and the functions of the keys, and the arrangement of the operation part 3 and the display part 4 may be determined according to another embodiment of the present invention.

Figure 3:
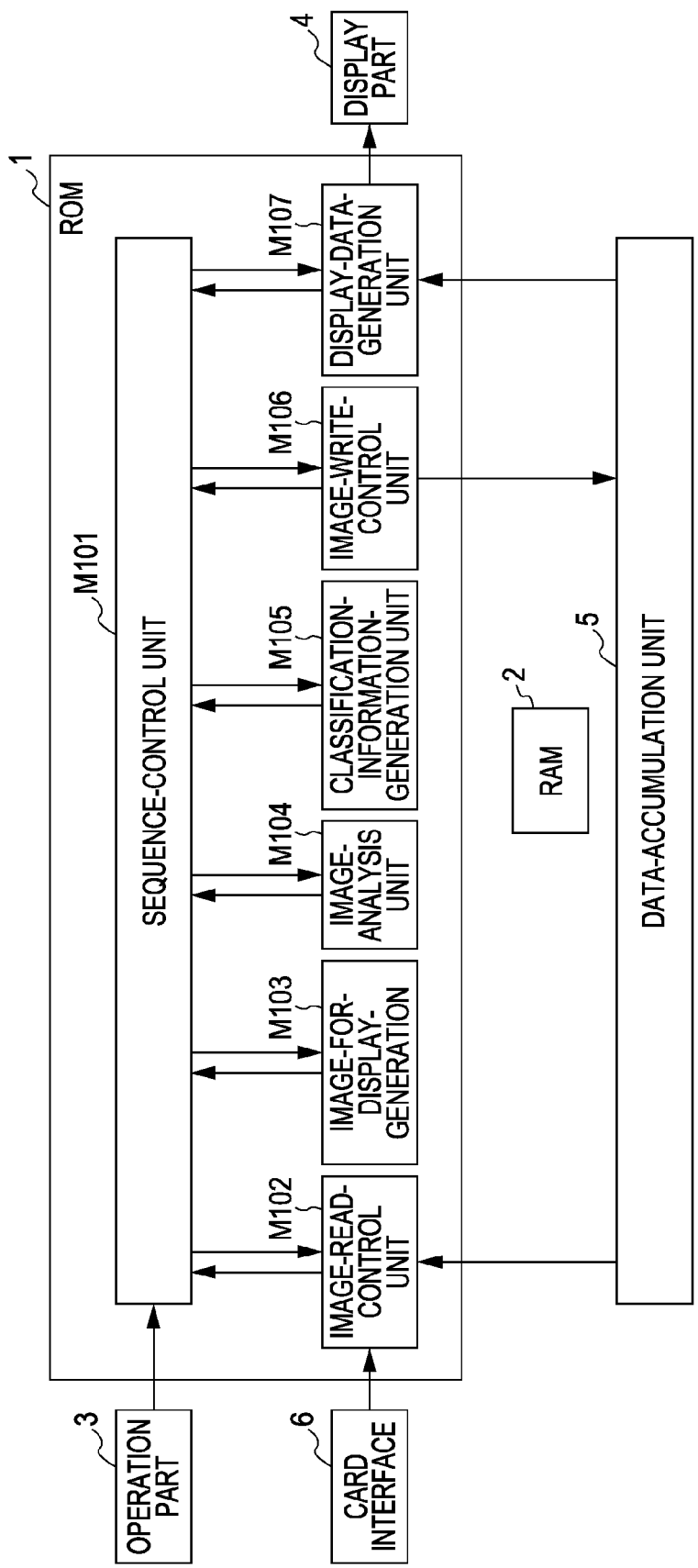
FIG. 3 is a block diagram showing the configuration of a program module.

FIG. 3 is a block diagram showing an exemplary configuration of a program module. As shown in FIG. 3, the program module includes a sequence-control unit M101, an image-read-control unit M102, an image-for-display-generation unit M103, an image-analysis unit M104, a classification-information-generation unit M105, an image-write-control unit M106, and a display-data-generation unit M107.

The sequence-control unit M101 controls other modules based on an instruction transmitted from the user through the operation part 3. The image-read-control unit M102 acquires image-file data and/or information-file data associated therewith from the card interface 6 and/or the image-accumulation unit 5 based on an instruction issued from the sequence-control unit M101, where the information-file data includes attribute information and/or classification information. Then, the image-read-control unit M102 stores the image-file data and/or the information-file data in the RAM 2. The image-for-display-generation unit M103 generates data for display, the data being used to display the image-file data, based on an instruction issued from the sequence-control unit M101.

According to an embodiment of the present invention, the data for display denotes thumbnail-image data and icon-image data. The thumbnail-image data is obtained by reducing the image-file data so that the image-file data is displayed in list form on the display part 4. Further, as for the icon-image data, image data is analyzed through the image-analysis unit M104 based on an instruction issued from the sequence-control unit M101 and the icon-image data is generated from the image-file data stored in the RAM 2, so as to correspond to the image data. During the image analysis, the color component, the attribute information, and so forth of the image-file data are analyzed.

According to an embodiment of the present invention, icon images are generated as below. First, individual pixels included in image-file data are divided in six groups of different colors including red, green, blue, gray, black, and white on a brightness-and-color-difference space based on the above-described image analysis. The most frequent color is determined to be the icon image corresponding to the image-file data. For example, a red icon image is generated for a reddish image such as an image captured at dusk, and a black icon image is generated for a dark image such as an image captured at night. Although the icon images are generated in the six colors in the above-described embodiment, the colors may be more fractionized. Further, even though the icon images are generated by using the pixel information, other information may be used. For example, icon images may be generated based on shooting-date information stored in association with the image-file data so that the icon images are divided into the groups corresponding to predetermined colors including yellow for spring, orange for summer, red for autumn, white for winter, and so forth.

The image-for-display-generation unit M103 is configured to generate at least one of a thumbnail image and an icon image for given image-file data. However, it is possible to control the image-for-display-generation unit M103 so that two images for display may be generated. The image-write-control unit M106 writes image-file data read from the card interface 6 into the data-accumulation unit 5 under the control of the sequence-control unit M101. Further, the icon-image data, the attribute information and so forth corresponding to the read image-file data is also written into the data-accumulation unit 5. The data-for-display-generation unit M107 transmits the data for display to the display part 4.

According to an embodiment of the present invention, massive image-file data and additional information going therewith are stored in the data-accumulation unit 5 in association with at least one of the thumbnail-image data and the icon-image data through an operation performed by the user.

A memory card storing joint-photographic-experts-group (JPEG)-image data captured by the user through an image-pickup device such as a digital camera is inserted into the card interface 6. Attribute information (Exchangeable_Image_File_format (Exif (registered trade mark)) tag) relating to the shooting is added to the JPEG-image data, where the attribute information indicates the camera name, the shooting time/date, etc. According to an embodiment of the present invention, the attribute information is one type of the additional information.

Figure 4:
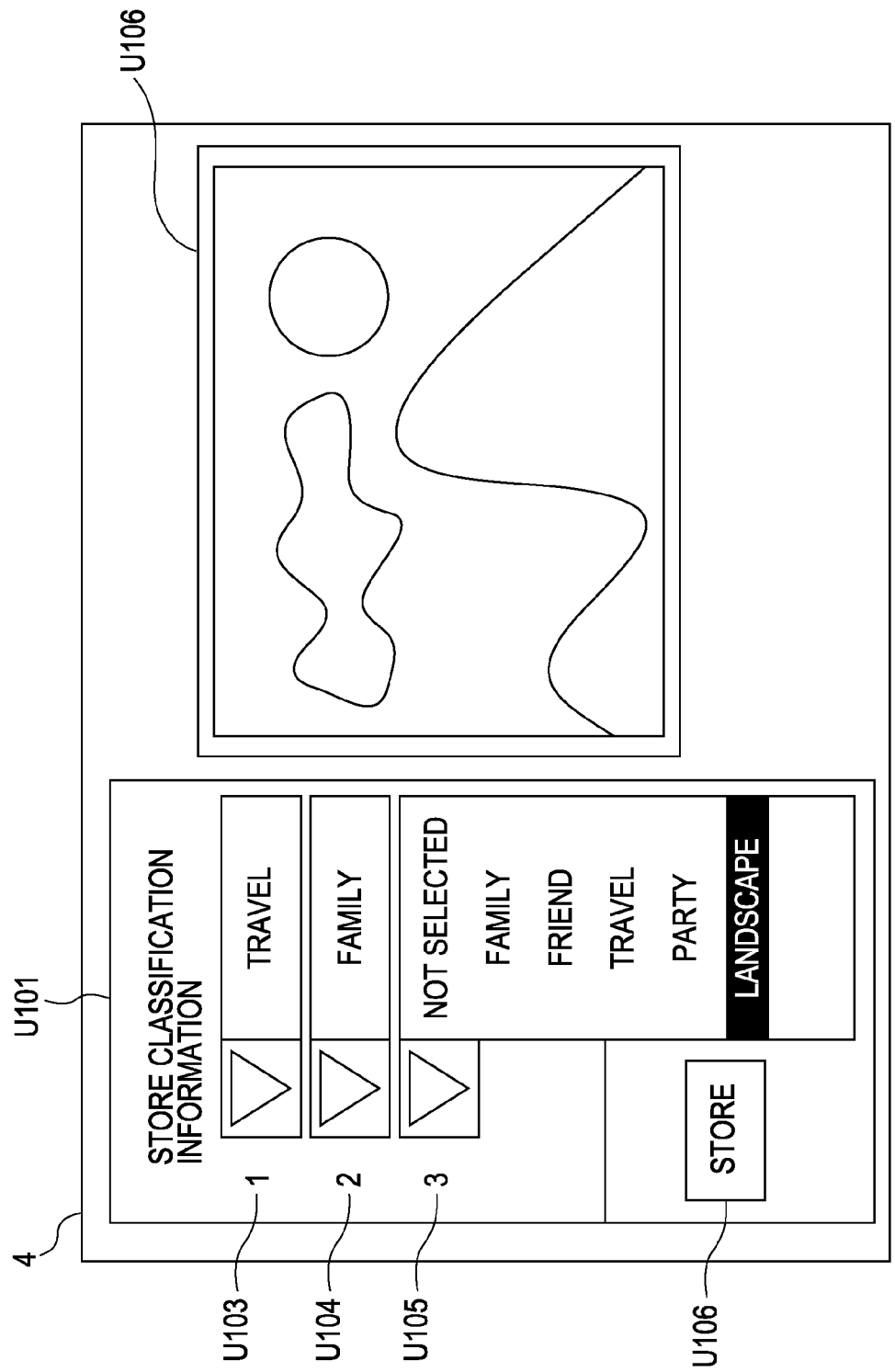
FIG. 4 shows displayed image-file data stored in a selected memory card.

FIG. 4 shows displayed image-file data stored in a selected memory card. A storage-menu part U101 and an image-display part U106 are displayed on the display part 4. The image-display part U106 is an area on which selected image file data is displayed. Further, the first dialog box U103, the second dialog box U104, the third dialog box U105, and a storage key U106 are displayed on the storage-menu part U101.

According to the above-described embodiment, classification information indicating "not selected", "family", "friend", "travel", "party", and "landscape" is shown in the first dialog box U103, as a menu. The classification information is also one type of the additional information. The case where a landscape photograph taken by the user when he was traveling with his family is stored will be exemplarily described. In that case, the user selects "travel" in the first dialog box U103, "family" in the second dialog box U104, and "landscape" in the third dialog box U105. Further, the user puts a cursor on the storage key U106 and presses the enter key D103 of the operation part 3. Through the above-described operations, the user can store desired image data in the data-accumulation unit 5 from the memory card.

Figure 5:
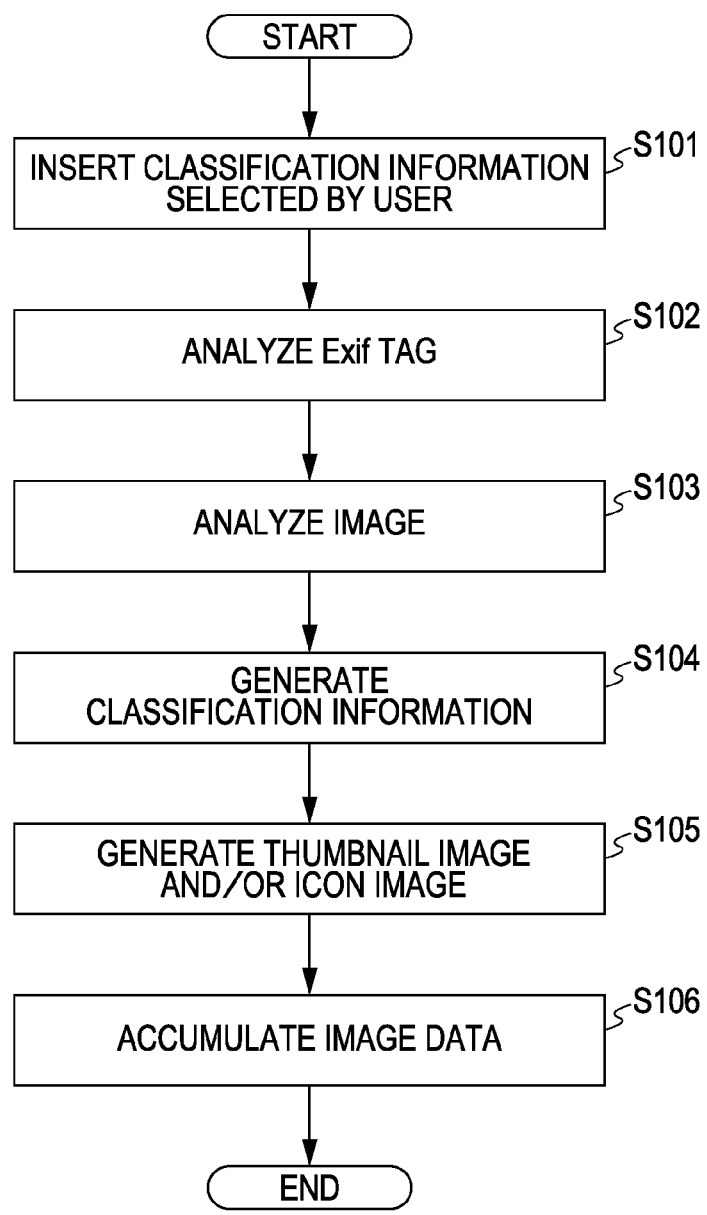
FIG. 5 is a flowchart illustrating processing procedures performed to store image data.

FIG. 5 is a flowchart illustrating processing procedures performed by the user, so as to store image data. FIG. 5 illustrates internal operations performed to store the image data.

Classification-information items indicating "family", "travel", and "landscape" that are selected by the user are stored in file data, at step S101. The above-described file data is referred to as additional-information-file data. The Exif tag is analyzed at step S102, and information about the camera name and/or the shooting date/time is stored in the additional-information-file data. The hue and/or the scene of the image data is analyzed, at step S103. For determining the hue, individual pixels of image-file data are divided in six groups of different colors including red, green, blue, gray, black, and white on the brightness-and-color-difference space. The most frequent color is used as hue information. Further, during the scene analysis, the color information and straight-line image data are extracted from the image data, and pattern matching are performed so that the image data is classified under seven groups indicating "mountain", "sea", "plant", "indoor", "building", "figure", and "group photo".

The image data classified at step S103 is stored in the additional-information-file data at step S104. Through the above-described processing procedures, the classification information specified by the user, attribute information of the Exif data, the attribute information being obtained through the Exif-tag analysis, and image-analysis-classification information obtained through the image analysis are stored in the additional-information-file data. At step S105, a color is selected based on the hue information written in the additional-information-file data, and data of a rectangular icon image is generated by using the selected color. Further, a reduced image for thumbnail display is generated based on the image-file data. At step S106, the generated additional-information-file data, the rectangular-icon-image data, and the image-file data are stored in the data-accumulation unit 5 in association with one another.

The above-described processing procedures are repeatedly performed so that many image-file-data items, additional-information-file-data items corresponding thereto, and icon-image-data items corresponding to the individual image-file-data items are stored in the data-accumulation unit 5.

First Embodiment

Figure 6:
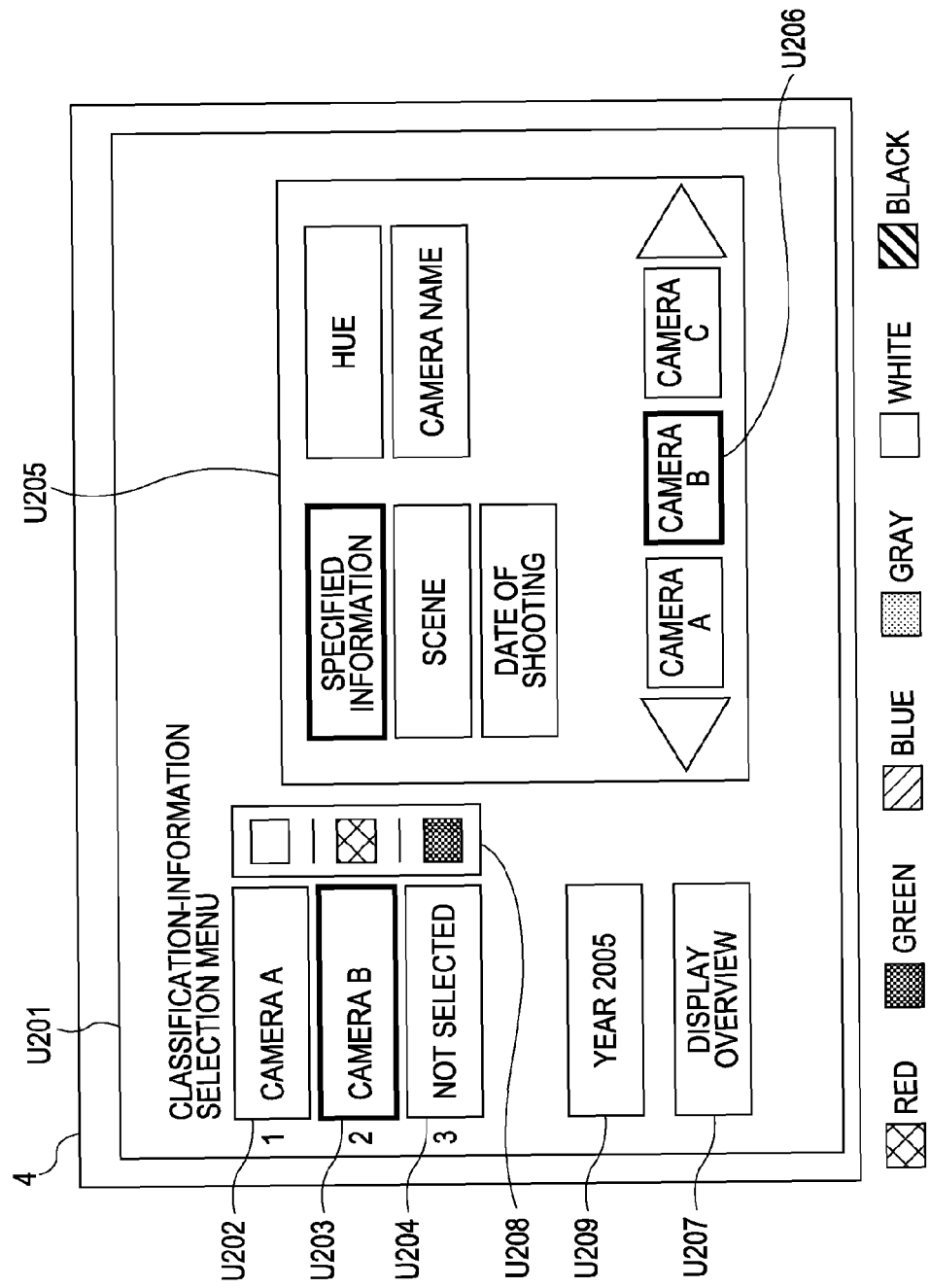
FIG. 6 shows a screen image provided to set the conditions for determining image-file-data items displayed in list form on the image-display apparatus.

Next, FIG. 6 illustrates instructions for selecting the additional information and executing the list display according to a first embodiment of the present invention.

FIG. 6 shows a screen image provided to set the conditions for determining image-file-data items displayed in list form. When the additional information is selected and the image-file-data items are displayed in list form, a list-display-menu part U201 is displayed on the display part 4. The list-display-menu part U201 includes the first additional-information-display part U202, the second additional-information-display part U203, and the third additional-information-display part U204 that are used to set conditions for searching for the image-file data. Further, the list-display-menu part U201 includes an additional-information-genre-selection part U205, an additional-information-selection part U206, a list-display key U207, an identification-color-selection part U208, and a narrowing key U209. Each of the additional-information-display parts U202, U203, and U204 shows additional information selected in advance. In the initial state, each of the additional-information-display parts U202, U203, and U204 shows the information item "not selected". The additional-information-genre-selection part U205 shows five information items "specified information", "hue", "scene", "camera name", "date of shooting". One of the above-described five information items is selected so that the classification information of a target genre is shown on the additional-information-selection part U206.

Here, the specified information denotes a classification-information item (any one of information items "family", "friend", "travel", "party", and "landscape") specified by the user during the image-data accumulation. Further, the information items "hue" and "scene" are classification information determined by performing the image analysis during the image-data accumulation. Still further, the information items "camera name" and "date of shooting" are attribute information determined based on the Exif-tag analysis during the image-data accumulation. The information item "camera name" denotes the name of a camera which picked up the image-file data, and the information item "date of shooting" denotes the date of shooting performed by using the above-described camera. The specified information, the classification information, and the attribute information that are associated with the image-file data are collectively referred to as the additional information.

For example, when the user displays the additional-information item "camera B" on the second additional-information-display part U203, the user puts the cursor on the second additional-information-display part U203 and presses the enter key D103 of the operation part 3. The cursor moves to the additional-information-genre-selection part U205. Next, the user selects the information item "camera name" shown on the additional-information-genre-selection part U205 and presses the enter key D103 of the operation part 3. The cursor moves to the additional-information-selection part U206 at that time. According to the above-described embodiment, the user can select the additional-information items "camera A (the first attribute information)" and "camera B (the second attribute information)" indicating cameras which picked up the image-file data so that the user selects the additional-information item "camera B".

Next, an instruction method used to perform the list display when the user selects the additional-information item "camera A", as the first additional-information item, and the additional-information item "camera B", as the second additional-information item.

The user displays the additional-information item "camera A" on the first additional-information-display part U202 and the additional-information item "camera B" on the second additional-information-display part U203. Further, the user displays the information item "not selected" on the third additional-information-display part U204. Further, the user puts the cursor on the narrowing key U209 and presses the enter key D103 of the operation part 3. After that, the user specifies the year in which the shooting is performed through the cross key D101, so as to narrow down image-data items for the list display. The user puts the cursor on the list-display key U207 and presses the enter key D103 of the operation part 3 so that the display part 4 is shifted to a list-display-screen image.

At that time, a color used for a thumbnail image is specified on the identification-color-selection part U208 so that the thumbnail image corresponding to the classification-information items "camera A" and "camera B" can be identified on a display-screen image. In the above-described embodiment, white is associated with the thumbnail image corresponding to the classification-information item "camera A", and red is associated with the thumbnail image corresponding to the classification-information item "camera B".

Next, an example where the user performs the list display by focusing attention on image-file data having the additional-information item "camera A" and that having the additional-information item "camera B" will be described.

Figure 7:
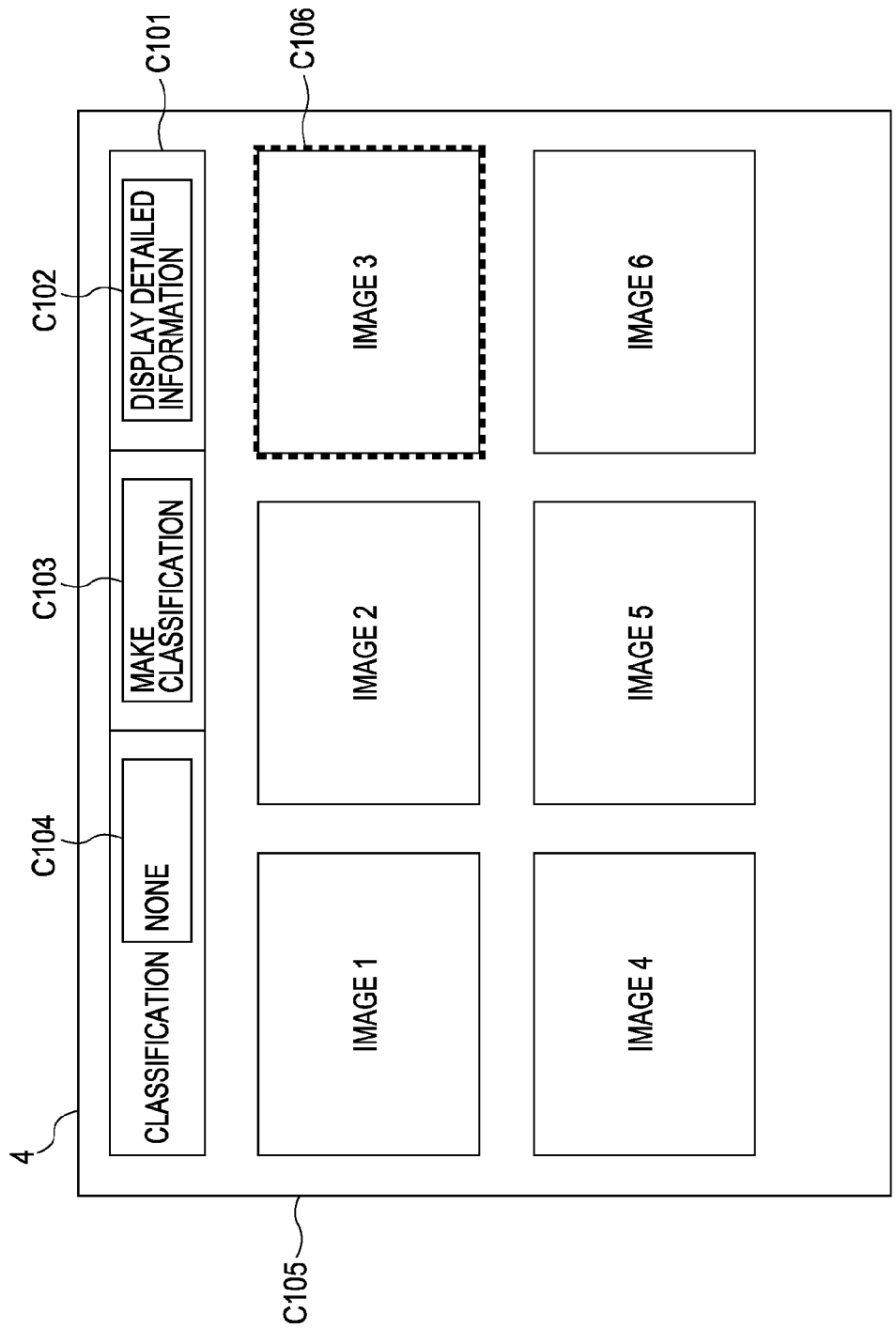
FIG. 7 shows the thumbnail images of image-file data, the thumbnail images being displayed in list form, according to a first embodiment of the present invention.

FIG. 7 shows the thumbnail images of the image-file data, the thumbnail images being displayed in list form. When the thumbnail images are displayed, the display part 4 shows a menu-display part C101 and a thumbnail-image-display part C105. The menu-display part C101 includes an additional-information-display part C102 and an additional-information-selection key C103. The thumbnail images are arranged in a two-dimensional manner on the thumbnail-image-display part C105 in shooting-date sequence from the left to the right and/or from the top to the bottom of the screen image.

During the above-described list display, the user can move an image-selection cursor C106 and select one of the thumbnail images by operating the cross key D101. Further, when the user presses the menu key D102, the target of an operation of the cross key D101 is shifted to the menu-display part C101 so that the additional-information-selection key C103 can be selected.

If the user puts the cursor on the additional-information-selection key C103 and presses the enter key at that time, the display part 4 displays an image used to select the additional-information items and issue an instruction to perform the list display, as shown in FIG. 6. Then, the additional-information items can be selected and stored again. In FIG. 7, six image-file-data items are displayed, as thumbnail images. An image 1, an image 2, an image 3, an image 4, an image 5, and an image 6 are displayed on the thumbnail-image-display part C105.

Next, an example where the thumbnail image corresponding to the first attribute information "camera A" of the above-described six thumbnail images is displayed will be described.

Figure 8:
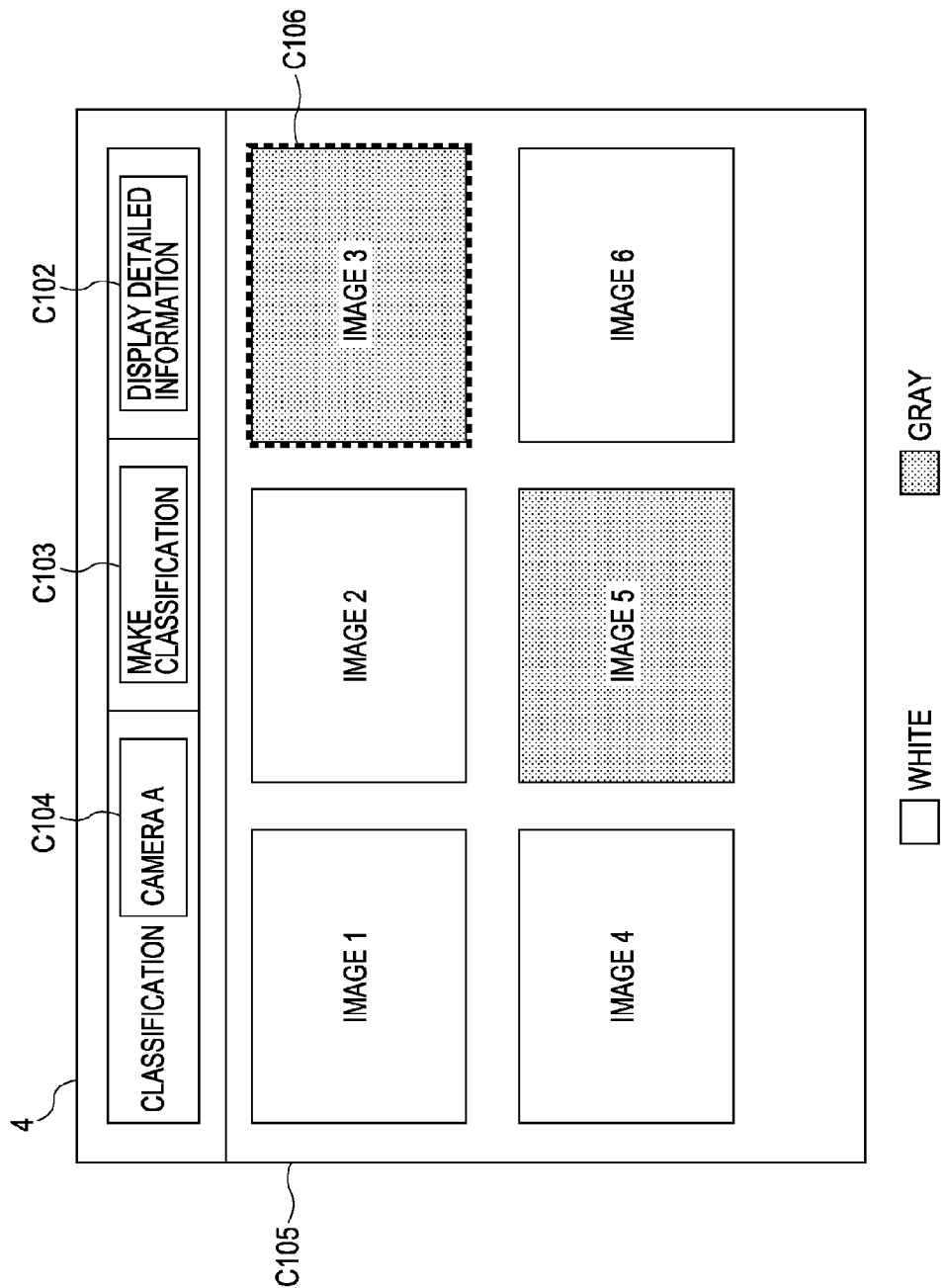
FIG. 8 shows the image-file data corresponding to the additional information of a camera A.

FIG. 8 shows an example where the image-file data corresponding to the attribute information of the camera A is displayed. A white component is superimposed on each of four thumbnail images including images 1, 2, 4, and 6 corresponding to the first attribute information "camera A" for display so that the white components become translucent on the four thumbnail images. The translucent-superimposition processing will be described later. Further, two thumbnail images including images 3 and 5 that do not correspond to the first attribute information "camera A" are subjected to gray-out processing by using a gray brightness component.

Figure 9:
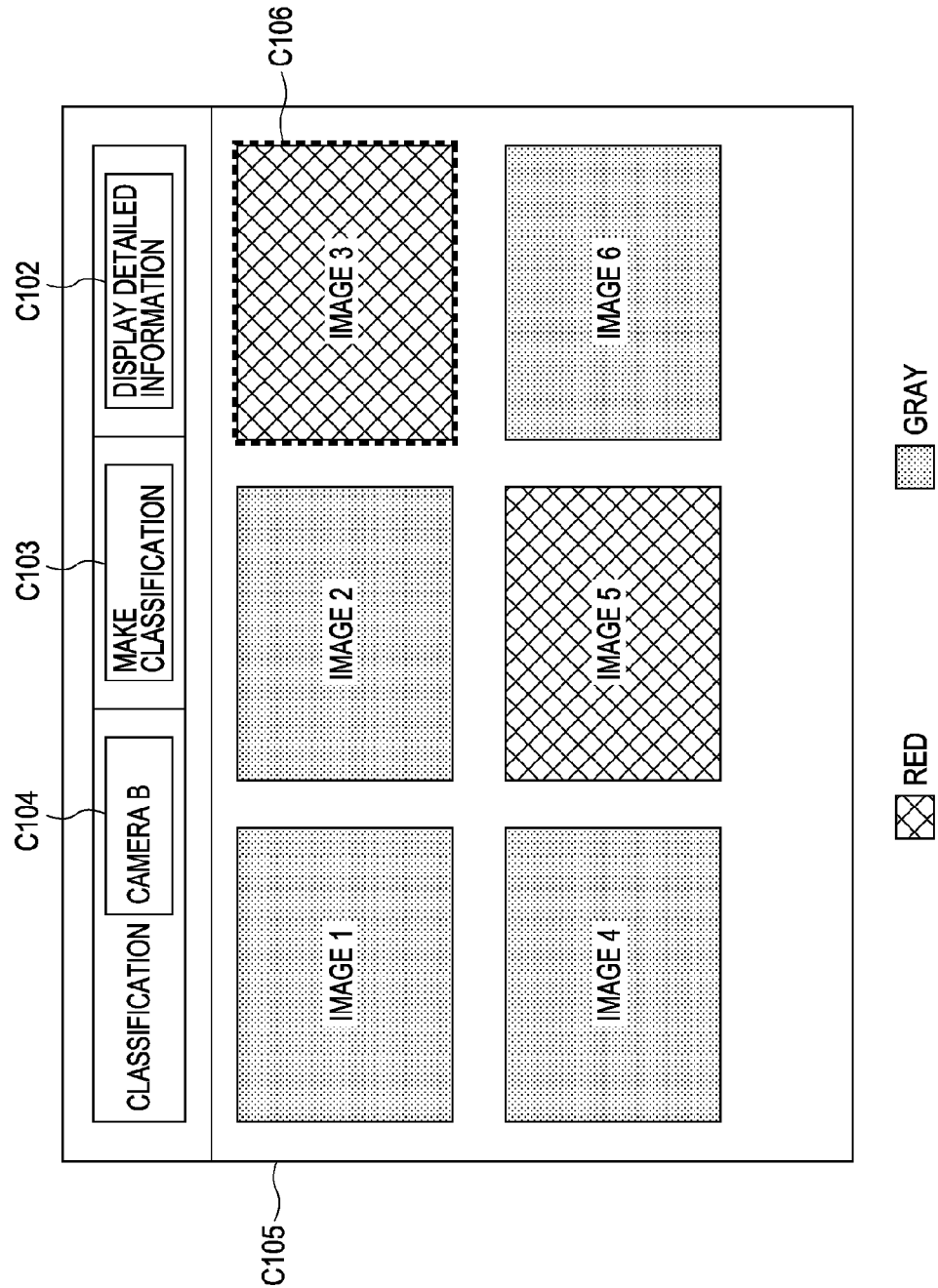
FIG. 9 shows the image-file data corresponding to the additional information of a camera B.

FIG. 9 shows an example where the image-file data corresponding to the attribute information of the camera B is displayed. A red component is superimposed on each of two thumbnail images including images 3 and 5 corresponding to the additional-information item "camera B" for display so that the red components become translucent on the two thumbnail images. Further, the four thumbnail images including the images 1, 2, 4, and 6 that do not correspond to the additional-information item "camera B" are subjected to the gray-out processing by using the gray brightness component.

Thus, all of the thumbnail images are displayed, as the first display pattern, as shown in FIG. 7. Then, the thumbnail images corresponding to the first additional-information item are displayed, as the second display pattern, as shown in FIG. 8. Further, the thumbnail images corresponding to the second additional-information item are displayed, as the third display pattern, as shown in FIG. 9. The thumbnail images are displayed by switching between the above-described display patterns at predetermined time intervals. Consequently, desired image data can be easily found.

Further, according to the displayed images described in FIGS. 8 and 9, the colors of the displayed images are changed, so as to differentiate the image-file data corresponding to predetermined attribute information from other image-file data. Therefore, without being limited to the above-described embodiment, only the color of the displayed image-file data corresponding to the predetermined attribute information may be changed, for example. Conversely, only the color of displayed image-file data which does not correspond to the predetermined attribute information may be changed.

Figure 10B:
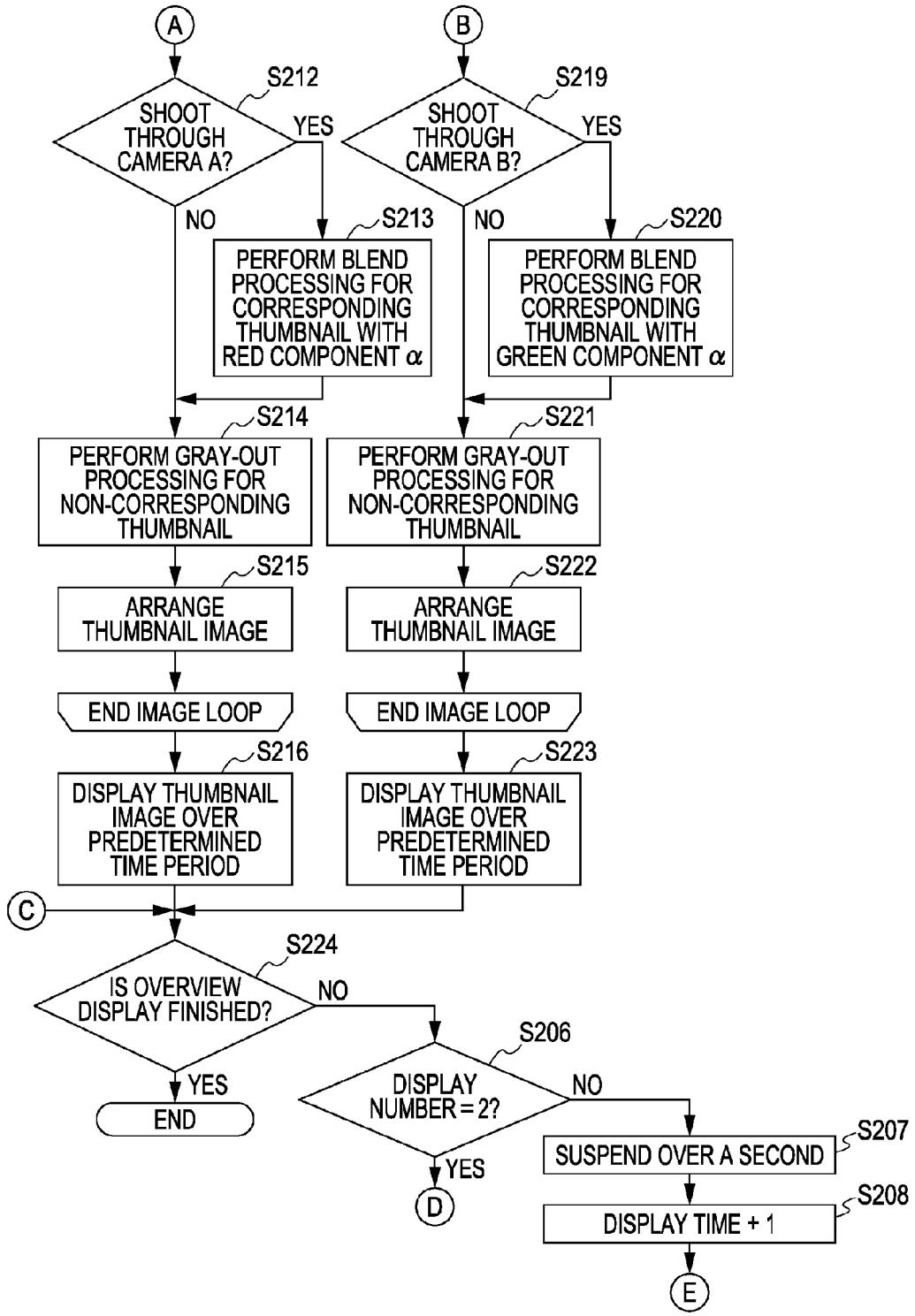
FIG. 10 is a flowchart showing processing procedures performed to display thumbnail images in list form according to the first embodiment.

Hereinafter, processing actually performed to display thumbnail images in list form and display the thumbnail image corresponding to set additional information will be described. FIG. 10 is a flowchart showing processing procedures performed to display thumbnail images in list form according to the first embodiment of the present invention. In the first embodiment, the number of the types of the display is "three". Namely, the above-described flowchart shows processing procedures performed to display three types of thumbnails including "thumbnails of the entire image-file data", "thumbnails of image-file data captured by the camera A", and "thumbnails of image-file data captured by the camera B".

The initial value of the display-time number is set to zero at step S201. Further, the maximum number of the display types is determined to be three, because there are two types of additional-information items "camera A" and "camera B" that can be selected, and the display of the thumbnails of the entire image-file data can be counted as one type. At step S202, it is determined whether a value obtained by dividing the number of times the display is performed by the display-type number is zero. The value of the display-time number is zero, as was set at step S201. On the other hand, the value of the display-type number is three. Therefore, the remainder is zero. At step S203, data of the thumbnail images corresponding to the image-file data stored in the data-accumulation unit 5 is acquired from the image-file data in order of decreasing oldness of the shooting date.

At step S204, the acquired thumbnail-image data is arranged in the RAM 2 as data for display in an order shown in FIG. 8, for example. Processing procedures performed between the step where an image loop is started and the step where the image loop is ended, the processing procedures being shown in the flowchart, are repeated the same number of times as the number of image-file-data items stored in the data-accumulation unit 5 so that the thumbnail images sorted in sequence of the shooting date are arranged in a two-dimensional manner. At step S205, thumbnail-image data stored in the RAM 2 is displayed on the display part 4. FIG. 7 shows what was displayed on the display part 4 in the above-described circumstances. Namely, thumbnail images generated based on original-image-file data are displayed on the thumbnail-image-display part C105 over a predetermined time period, which is the first display pattern. Further, since no condition is set for the display type, the information item "none" is displayed on an additional-information-display part C104.

At step S224, it is determined whether the user gives an instruction to finish the thumbnail-image display (finish the list display). If the instruction is given, the processing procedures are finished. Otherwise, the processing advances to step S206 where it is determined whether the value of the display-time number is two. If the value of the display-time number is not two, the processing advances to step S207. Otherwise, the processing returns to step S201. The processing is suspended over a second at step S207. At step S208, 1 is added to the display-time number. More specifically, after the thumbnails of the entire image-file data are displayed, the value of the display-time number becomes one and the processing returns to step S202.

At step S202, since the thumbnail display is performed once, the remainder of dividing the display-time number which is one by the display-type number which is three becomes one. At step S209, it is determined whether the remainder obtained at step S202 is one. If the remainder is one, the processing advances to step S210. Otherwise, the processing advances to step S217. At step S210, additional information associated with the image data when the remainder is one is acquired. The additional information used at that time is the first additional information "camera A" specified by the user. At step S211, the additional-information-file data corresponding to image-file data is acquired in order of decreasing oldness of the shooting date of the image-file data.

At step S212, it is checked whether specified classification information exists in the additional-information-file data acquired at step S211. In the above-described embodiment, it is checked whether the additional-information item "camera A" exists. If the additional-information item "camera A" does not exist, the processing advances to step S214. Otherwise, the processing advances to step S213. At step S214, of the displayed thumbnail images, thumbnail images that does not correspond to the additional-information item "camera A" are subjected to the gray-out processing and displayed over a predetermined time period. Processing performed to reduce the display brightness of the image-file data may be considered as the gray-out processing. On the other hand, at step S213, the following processing is performed for the thumbnail images corresponding to the additional information "camera A".

Namely, a thumbnail image composed through α-blend processing achieved by using a component having a color specified through the identification-color-selection part U208 shown in FIG. 6, that is, a white component (the first color component) is displayed over a predetermined time period. At step S215, thumbnail images subjected to the α-blend processing and the gray-out processing are arranged in the same manner as that used at step S204. The processing procedures performed between the step where the image loop is started and the step where the image loop is ended are repeated the same number of times as the number of image-file-data items stored in the data-accumulation unit 5.

The arranged thumbnail images are displayed at step S216. FIG. 8 shows what is displayed on the display part 4 at step S216. If the additional-information item "camera A" is included in the additional-information-file data, the thumbnail image corresponding to the additional-information-file data is subjected to the α-blend processing achieved by using the white component and displayed on the thumbnail-image-display part C105. If the additional-information item "camera A" is not included in the additional-information-file data, the thumbnail image corresponding to the additional-information-file data is subjected to the gray-out processing and displayed on the thumbnail-image-display part C105. The above-described display pattern is referred to as the second display pattern. Here, the α-blend processing denotes the technology of superimposing one of two images on the other so that the image superimposed on the other becomes translucent by using a predetermined coefficient. Further, the additional-information item "camera A" is displayed on the additional-information-display part C104. Consequently, the user can easily find image-file data classified as "camera A".

After that, the processing goes to step S208 via steps S224 and S207 so that 1 is added to the display-time number, whereby the value of the display-time number becomes 2 and the processing goes to step S202. At step S202, the value of the display-time number is 2 and that of the display-type number is 3 so that the remainder becomes 2. Therefore, the processing advances to step S217 where additional information associated with the image data when the remainder is 2 is acquired. The additional information acquired then is the second additional-information item "camera B" specified by the user.

At step S218, the additional-information-file data corresponding to image-file data is acquired in order of decreasing oldness of the shooting date/time of the image-file data. At step S219, it is checked whether specified classification information exists in the additional-information-file data acquired at step S218. In the above-described embodiment, it is checked whether the additional-information item "camera B" exists. If the additional-information item "camera B" does not exist, the processing advances to step S221. Otherwise, the processing advances to step S220. At step S221, of the displayed thumbnail images, thumbnail images that do not correspond to the additional-information item "camera B" are subjected to the gray-out processing and displayed over a predetermined time period.

On the other hand, at step S220, the thumbnail images corresponding to the additional-information item "camera B" are subjected to the α-blend processing by using the red component (the second color component) specified on the identification-color-selection part U208 and displayed over a predetermined time period. At step S222, thumbnail images subjected to the α-blend processing and the gray-out processing are arranged according to the same method as that performed at step S204. The processing procedures performed between the step where the image loop is started and the step where the image loop is ended, which are shown in the flowchart, are repeated the same number of times as the number of image-file-data items stored in the data-accumulation unit 5.

The arranged thumbnail images are displayed at step S223. FIG. 9 shows what is displayed on the display part 4. If the additional-information item "camera B" is included in the additional-information-file data, the thumbnail image corresponding to the additional-information-file data is subjected to the α-blend processing achieved by using the red component and displayed on the thumbnail-image-display part C105. If the additional-information item "camera B" is not included in the additional-information-file data, the thumbnail image corresponding to the additional-information-file data is subjected to the gray-out processing and displayed on the thumbnail-image-display part C105. The above-described display pattern is referred to as the third display pattern. Further, the additional-information item "camera B" is displayed on the additional-information-display part C104. Consequently, the user can easily find image-file data classified as "camera B".

By repeating the above-described processing procedures, each of the display of the thumbnail images of the entire image-file data (shown in FIG. 7), the display of the thumbnail images of image data captured by the camera A (shown in FIG. 8), and the display of the thumbnail images classified as the images captured by the camera B (shown in FIG. 9) is displayed on the display part 4 for a predetermined time period and switched over to another. Although the predetermined time period is determined to be a second, the time period may be determined without being limited to the above-described embodiment as a matter of course.

Thus, according to the above-described embodiment, the switching between the first display pattern and the second display pattern is done every predetermined time period. The first display pattern allows for selecting the hue information and the image-file data classified as "travel" from the massive image data stored in the data-accumulation unit 5, displaying the hue information, and coloring and displaying the image-file data. The second display pattern allows for coloring and displaying the image-file data classified as "family". Accordingly, the user can clearly identify the classification of image data and easily find an image which satisfies a condition without performing complicated operations.

In the above-described embodiment, the maximum number of the additional-information items that can be specified by the user is determined to be three. However, in another embodiment of the present invention, the above-described maximum number may be four or more. Further, in the above-described embodiment, the display is switched from the first display pattern to the third display pattern via the second display pattern. However, the switching may be performed without being limited to the above-described embodiment. It may be arranged so that the display is performed in the first display pattern and switched over to the second display pattern so that the display is performed in the second display pattern over a predetermined time period. Then, the display may be switched back to the first display pattern and switched back and forth between the first display pattern and the third display pattern. In that case, the first display pattern is determined to be a master display pattern so that the display is switched from the first display pattern to the second display pattern and/or the third display pattern, which makes it easy for the user to identify the images corresponding to individual conditions. Further, even though each of the thumbnail images for display is generated as occasion arises in the above-described embodiment, display data generated in advance may be stored in the RAM 2 and/or the data-accumulation unit 5, and read therefrom and displayed.

Second Embodiment

A method of displaying certain image-data items in list form according to a second embodiment of the present invention will be described. There is a limit to displaying massive image-file data on a limited display-screen image as thumbnail images. In the second embodiment, data of the most frequent color is extracted from pixel data of the image-file data, and icon images having the most frequent color are generated and displayed in list form. Then, the pattern in which the icon image is displayed is changed for each additional-information item so that the icon image is displayed in a color determined in advance in accordance with the additional-information item.

First, the user selects desired information from among additional-information items and issues an instruction to execute the list display. Making the selection from among the additional-information items is almost the same as that performed on the list-display-menu part U201 described in FIGS. 5 and 6 according to the first embodiment.

Next, an instruction method used when the user selects the classification-information item "travel" as the first additional information and the classification-information item "family" as the second additional information and performs the list display will be exemplarily described.

The user displays the classification-information item "travel" on the first additional-information-display part U202 and the classification-information item "family" on the second additional-information-display part U202. Further, the user displays the information item "not selected" on the third additional-information-display part U204. Further, the user puts the cursor on the narrowing key U209 and presses the enter key D103 of the operation part 3. After that, the user specifies the year in which the shooting is performed through the cross key D101, so as to narrow down image-data items targeted for the list display. Then, the user puts the cursor on the list-display key U207 and presses the enter key D103 of the operation part 3 so that the display part 4 is shifted to the list-display-screen image.

At that time, the icon color is specified as white on the identification-color-selection part U208, so as to correspond to the classification-information item "travel", and specified as red on the identification-color-selection part U208, so as to correspond to the classification-information item "family". Next, as is the case with the above-described instruction method, an example where the user performs the list display by focusing attention on image-file data having the classification-information item "travel" and that having the classification-information item "family" will be described. Here, the above-described example will be described based on the premise that white is set as the icon color for the classification-information item "travel" and red is set as the icon color for the classification-information item "family".

FIG. 11 shows the icon images displayed in list form, the icon images corresponding to image-file data. FIG. 12 shows the pattern of displaying the icon images corresponding to the classification-information item "travel". FIG. 13 shows the pattern of displaying the icon images corresponding to the classification-information item "family".

Referring to FIG. 11, when the icon images are displayed in list form, the display part 4 includes the menu-display part C101 and an icon-list-display part C105. Further, the menu-display part C101 includes a detailed-information-display part C102, the additional-information-selection key C103, and the additional-information-display part C104. Further, the icon images are arranged on the icon-list-display part C105 in a two-dimensional manner. The icon images are arranged on the thumbnail-image-display part C105 in shooting-date sequence from the left to the right and/or from the top to the bottom.

During the above-described icon-list display, the user can select the icon image by moving the image-selection cursor C106 by operating the cross key D101. Further, when the user presses the menu key D102, the target of the operation of the cross key D101 is shifted to the menu-display part C101 so that the additional-information-selection key C103 and the detailed-information-display key C102 can be selected.

If the user puts the cursor on the additional-information-selection key C103 and presses the enter key at that time, the display part 4 displays an image used to select the additional-information items and issue an instruction to perform the list display, as shown in FIG. 6, so that the additional-information items can be selected and stored again. Further, if the user puts the cursor on the detailed-information-display key C102 and presses the enter key, information about the details on an image selected by the image-selection cursor C106 is displayed.

Figure 14:
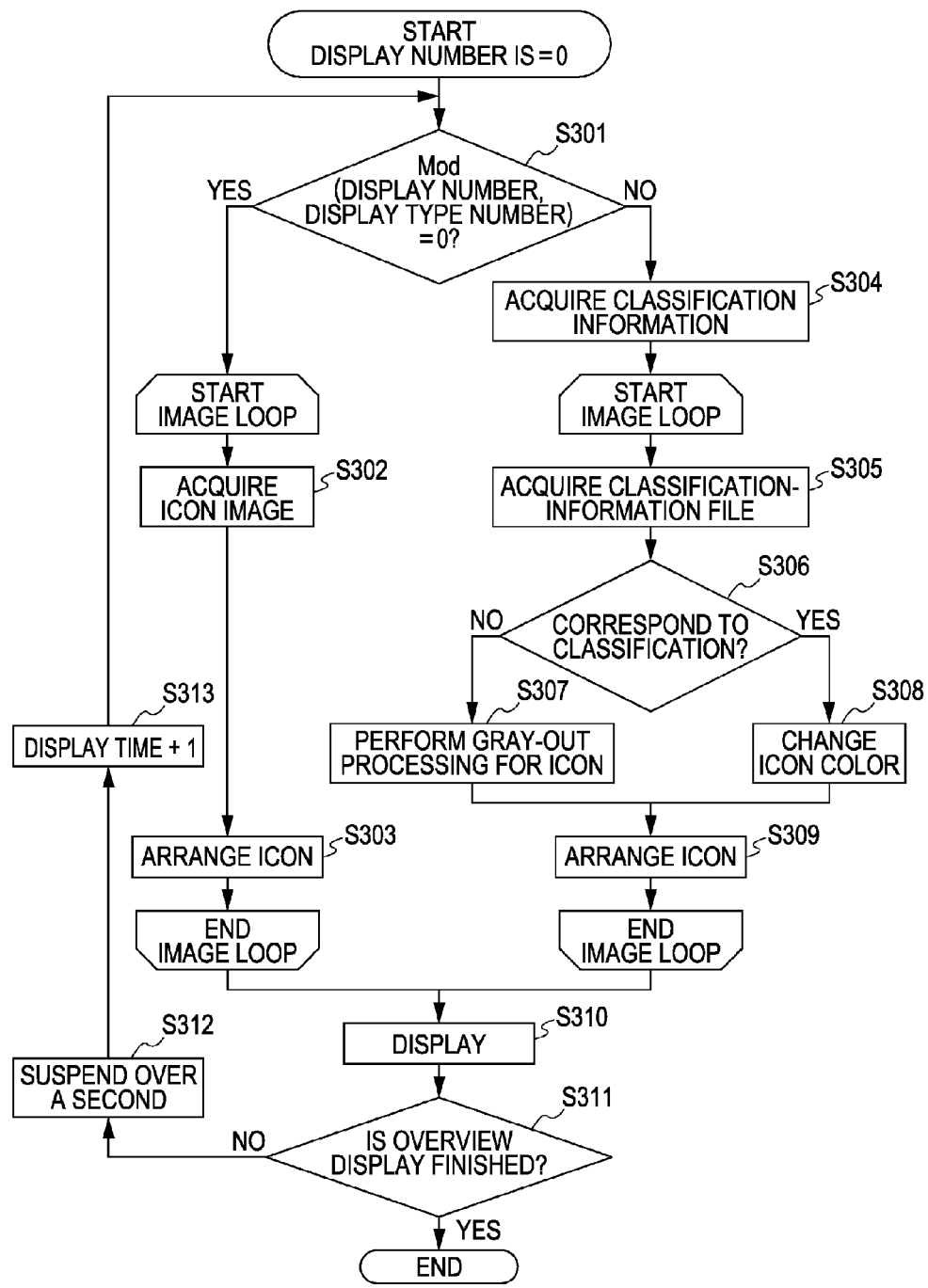
FIG. 14 is a flowchart showing processing procedures performed to display icon images in list form according to the second embodiment.

FIG. 14 is a flowchart showing processing procedures performed to display the icon images in list form. The initial value of the display number is set to "0". Since two types of additional-information items including the additional-information items "travel" and "family" are selected, and the pattern of displaying the icon images in list form is additionally selected, the number of the display types is set to "3".

Since the remainder of dividing the display-time number "0" by the display-type number "3" is 0 at step S301, the processing advances to step S302. At step S302, the icon-image-data items corresponding to the image-data items stored in the data-accumulation unit 5 are acquired from the image-data items in order of decreasing oldness of the shooting date of the image-data item. At step S303, the acquired icon-image-data items are arranged in the RAM 2 in predetermined order and stored, as image data for display. Processing procedures performed between the step where an image loop is started and the step where the image loop is ended, the processing procedures being shown in the flowchart, are repeated the same number of times as the number of image-file-data items stored in the data-accumulation unit 5.

At step S310, the image data for display stored in the RAM 2 is displayed on the icon-list-display part C105. At that time, the icon images are displayed on the icon-list-display part C105, as shown in FIG. 11. Thus, since original icon images generated based on the image analysis are displayed on the icon-list-display part C105, the hue of the image-file data corresponding to the original-icon images can be determined. The above-described display is performed only to display all of the icon images of the image-file data. Namely, the above-described display is not performed to display the icon images corresponding to the additional information. Therefore, an indication which reads "none" is displayed on the additional-information-display part C104.

Next, at step S311, it is determined whether the user gives an instruction to finish the list display. If the user gives the instruction, the processing is finished. Otherwise, the processing advances to step S312 where the processing is suspended over a second. At step S313, 1 is added to the display-time number so that the display-time number becomes 1. Returning to step S301, since the remainder of dividing the display-time number "1" by the display-type number "3" is 1, the processing advances to step S304. At step S304, the additional-information item corresponding to the remainder calculated at step S303, which is 1, is acquired. Then, the processing advances to step S305.

The above-described additional-information item corresponding to the remainder becomes the classification-information item "travel", which is the first additional-information item specified by the user. At step S305, the additional-information-file-data items corresponding to the image-data items are acquired in the order of the shooting date of the image-data item (i.e., from newest to oldest). Then, the processing advances to step S306. At step S306, it is checked whether the classification information "travel" exists in the additional-information-file data. If the existence is determined, the processing advances to step S308. Otherwise, the processing advances to step S307.

At step S307, a gray icon image is generated. At step S308, an icon image displayed in white which is the color specified on the identification-color-selection part U208 is generated. At step S309, the icon images generated at steps S307 and S308 are arranged in the same arranging method as that used at step S303. FIG. 12 shows what is displayed on the display part 4 after step S310 is performed. On the icon-list-display part C105, the icon images corresponding to the image data corresponding to the additional-information-file data including the additional information "travel" are displayed in white. Other icon images are displayed in gray. Further, the additional information "travel" is displayed on the additional-information-display part C104.

Therefore, the user can find the location of data of images classified as "travel". Then, "1" is added to the display-time number at step S313 so that the display-time number becomes "2", and the processing returns to step S301. Since the remainder obtained by dividing the display-time number "2" by the display-type number "3" is 2, the processing advances to step S304. At step S304, the additional-information item corresponding to the remainder "2" calculated at step S301 is acquired. At that time, the corresponding additional-information item becomes the second additional-information item "family", which is specified by the user.

At step S305, the additional-information-file-data items corresponding to the image-data items are acquired in order of decreasing oldness of the shooting date of the image-data item. At step S306, it is checked whether the information "family" exists in the additional-information-file data. If the existence is determined, the processing advances to step S308. Otherwise, the processing advances to step S307. At step S307, a gray icon image is generated. At step S308, an icon image displayed in red which is the color specified on the identification-color-selection part U208 is generated.

At step S309, the generated icon images are arranged in the same arranging method as that used at step S303. FIG. 13 shows what is displayed on the display part 4 after step S310 is performed. On the icon-list-display part C105, the icon images corresponding to the additional-information-file data including the information "travel" are displayed in red. Other icon images are displayed in gray. Further, the additional information "family" is displayed on the additional-information-display part C104. Therefore, the user can find the location of data on images classified as "family".

The above-described processing procedures are repeated so that what is displayed on the display part 4 is switched from the original-icon images shown in FIG. 11 to the icon images classified as "travel", which are shown in FIG. 12, and to the icon images classified as "family", which are shown in FIG. 13 at predetermined time intervals. Although the display switching is performed every one second in the above-described embodiment, a different time period may be set as the predetermined time interval.

Thus, according to the second embodiment, the user can select desired image data from the massive image-file data stored in the data-accumulation unit 5 while associating the first display pattern in which the hue information and the image-file data classified as "travel" are displayed with the second display pattern in which the image-file data classified as "family" is displayed.

In the above-described embodiment, the maximum number of the additional-information items that can be specified by the user is determined to be three. However, in another embodiment of the present invention, the above-described maximum number may be four or more as a matter of course. Further, even though display data is generated as occasion arises in the above-described embodiment, display data that had been generated may be stored in the RAM 2 and/or the data-accumulation unit 5, and displayed as required as a matter of course.

Further, although the condition setting in which the specified additional-information items are related only to the cameras has been exemplarily described, image-file data satisfying two conditions such as the travel and the family can also be specified.

Figure 15:
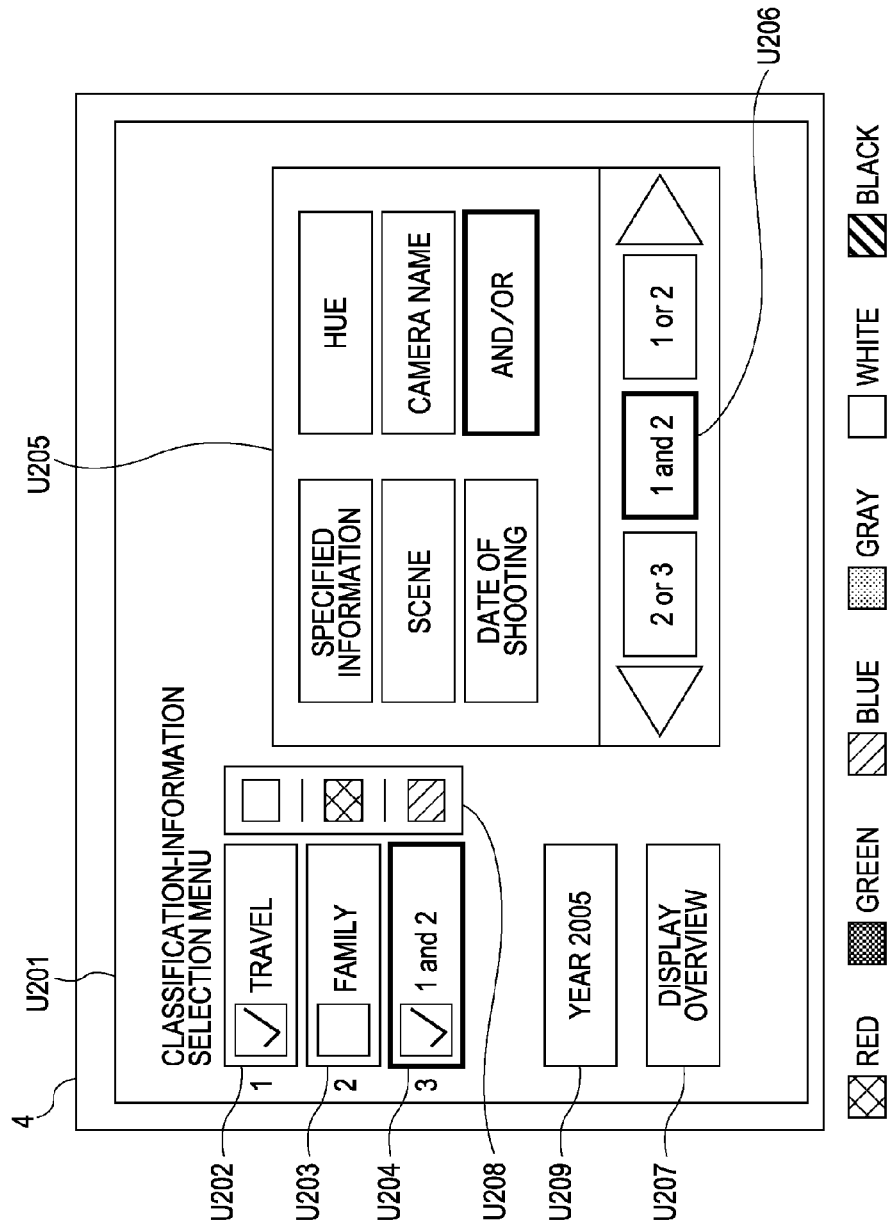
FIG. 15 shows a screen image displayed when two additional-information items are set.

FIG. 15 shows a screen image displayed when two additional-information items are set. Although the names and functions of the individual units are almost the same as those used in the first embodiment, the additional-information-display parts U202, U203, and U204 that are used in the second embodiment are different from those used in the first embodiment in that check boxes are provided on the individual additional-information-display parts U202, U203, and U204.

For example, if the additional-information item "travel" is specified on the first additional-information-display part U202, the check box is automatically marked. Then, the information item "AND/OR" is selected on the additional-information-genre-selection part U205. The information item "1 AND 2" is selected on the additional-information-selection part U206. The additional-information item "1 AND 2" is displayed on the third additional-information-display part U204 so that the user can select the image-file data corresponding to the two additional-information items "travel" and "family".

Figure 16:
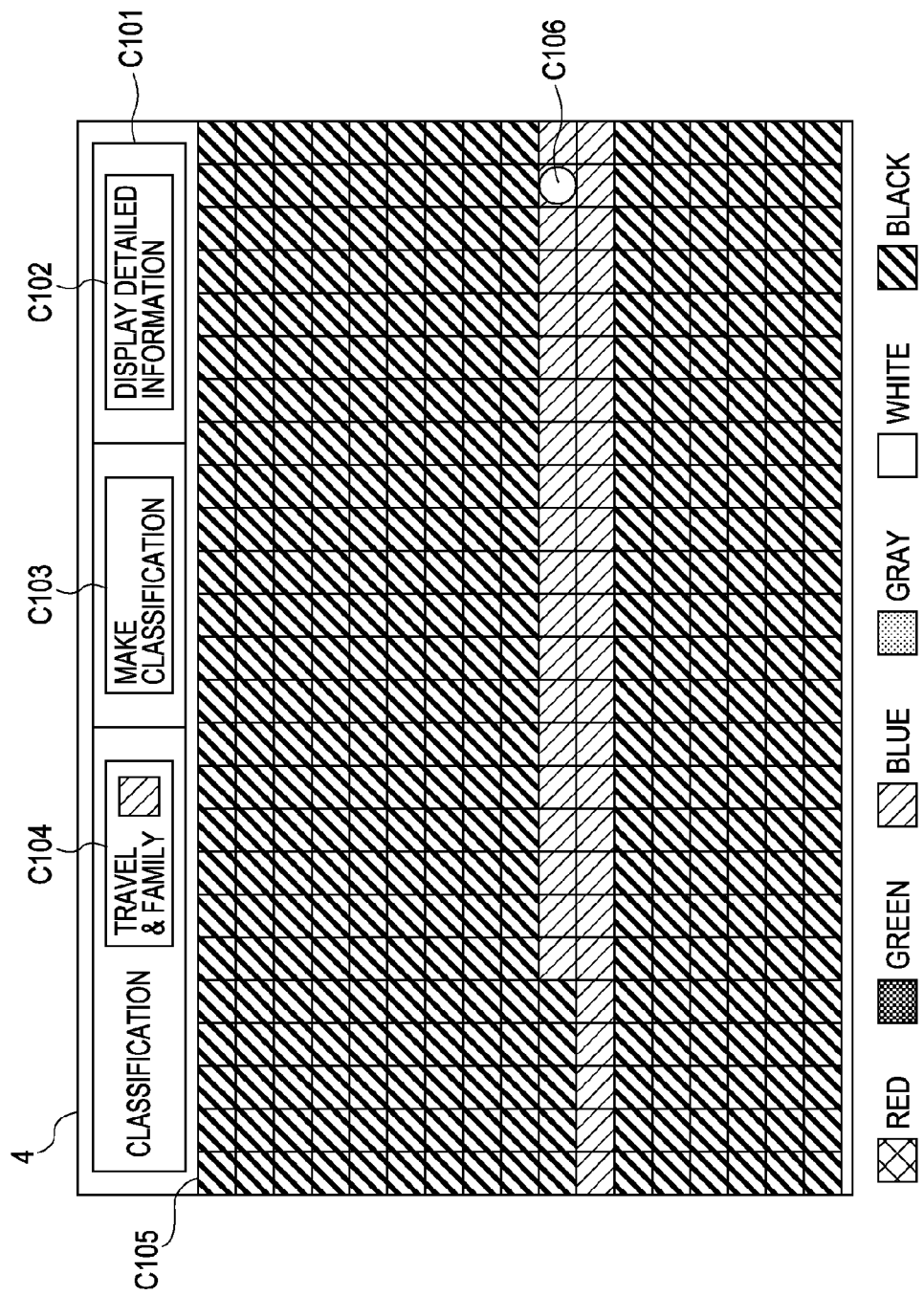
FIG. 16 shows the icon images of image-file data in list form, the image-file data corresponding to the two additional-information items.

FIG. 16 shows the icon images of the image-file data corresponding to the two additional-information items, the icon images being displayed in list form. The additional-information item "travel & family" is displayed on the additional-information-display part C104. Further, the icon image corresponding to the above-described additional-information item is displayed in light blue on the icon-list-display part C105, and icon images that do not correspond to the above-described additional-information item are filled with black.

Third Embodiment

Next, a method of displaying image-data items in list form according to a third embodiment of the present invention will be described. In the third embodiment, the icon images corresponding to the image data stored in the data-accumulation unit 5 are displayed by the shooting month, as a histogram.

Since processing performed to select the additional-information item and generate an icon image based on the selected additional-information item is almost the same as that performed in the second embodiment, the detailed description thereof is omitted. However, the above-described processing performed in the third embodiment will be described with an emphasis on the difference between the above-described processing and the processing performed in the second embodiment.

Figure 17:
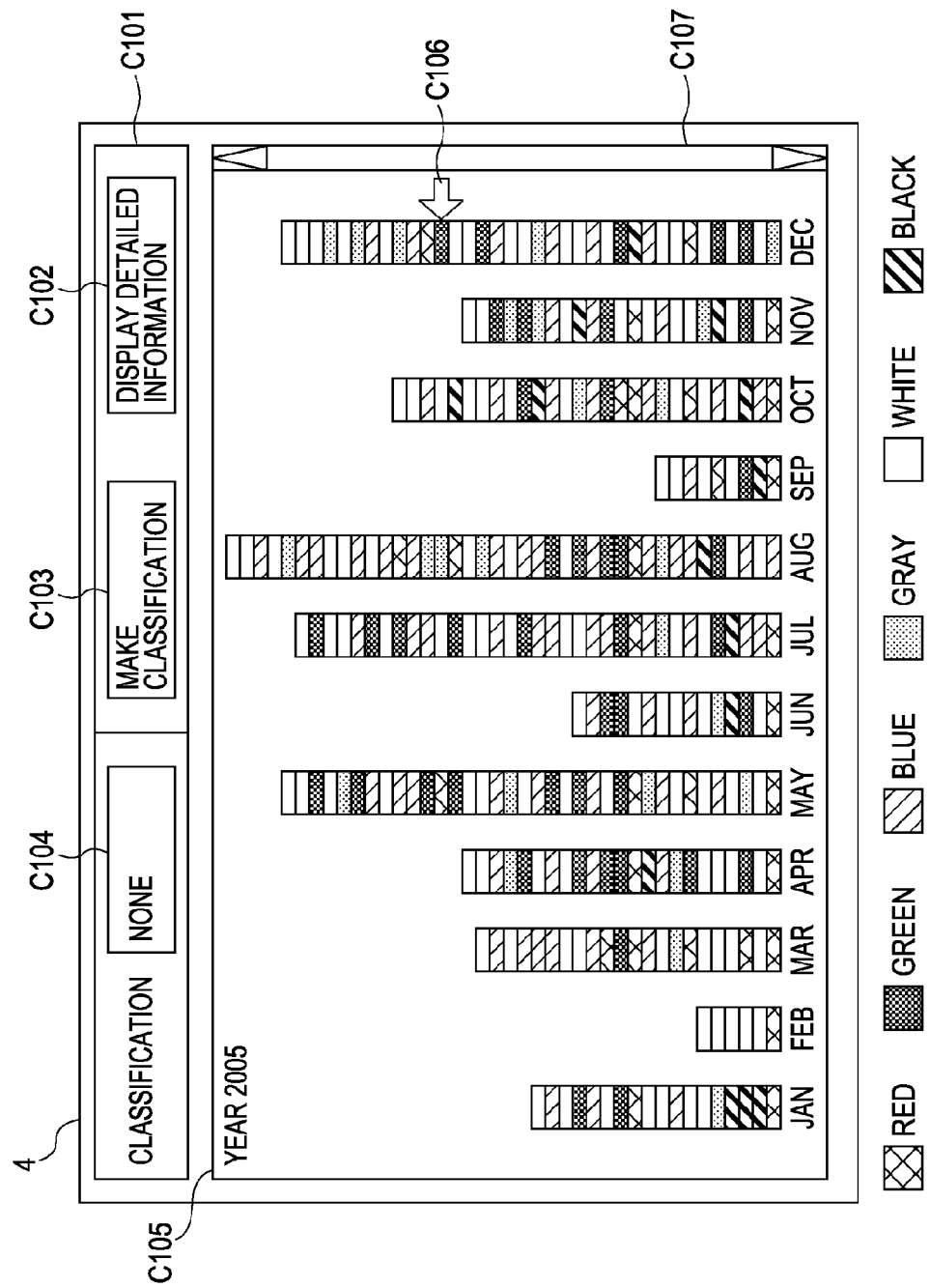
FIG. 17 shows icon images displayed in list form as a histogram according to a third embodiment of the present invention.
Figure 18:
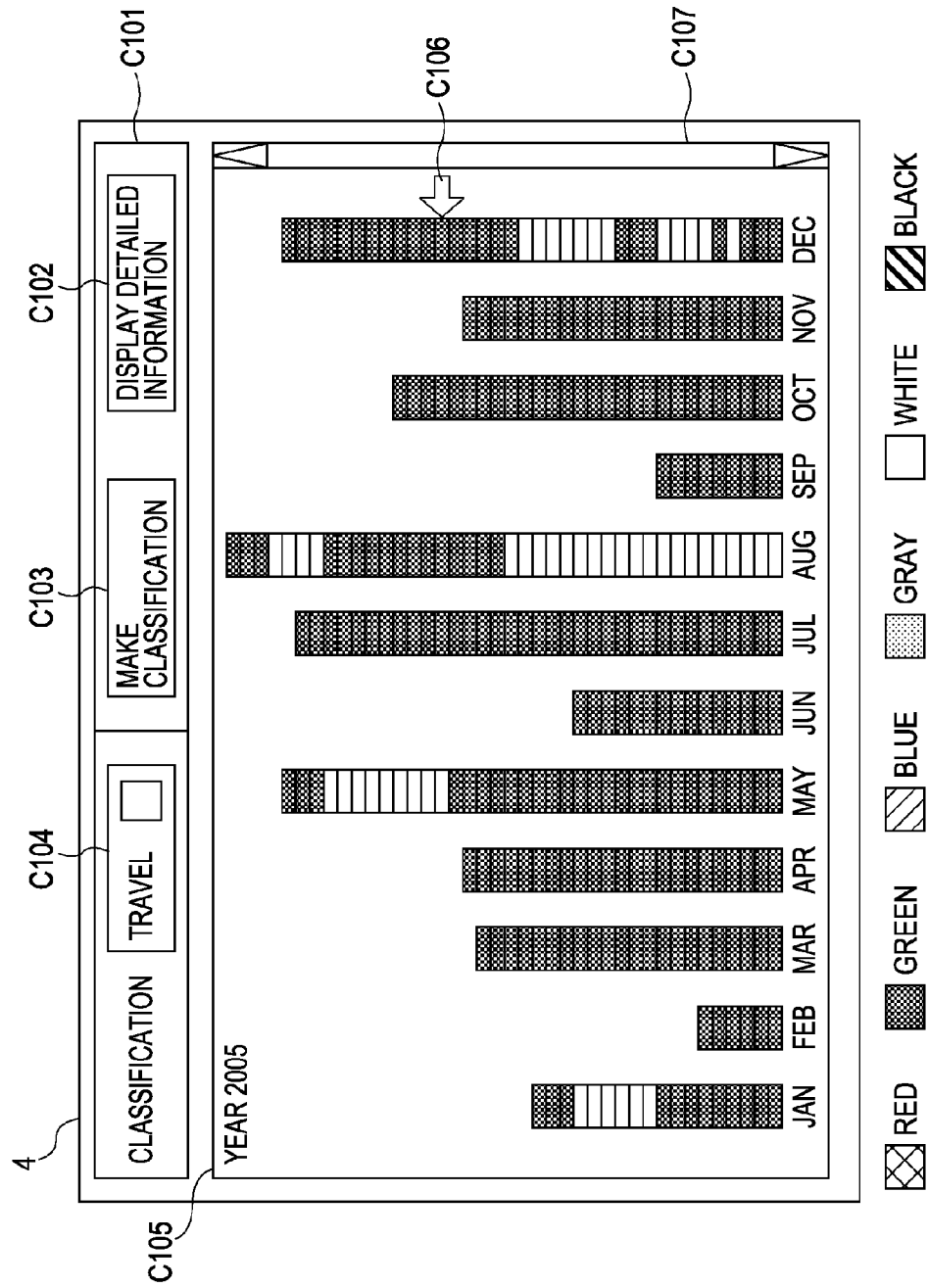
FIG. 18 shows icon images relating to "travel" as a histogram.

FIG. 17 shows icon images displayed in list form as a histogram. FIG. 18 shows icon images displayed in list form as a histogram, the icon images relating to "travel". FIG. 19 shows icon images displayed in list form as a histogram, the icon images relating to "family".

The histogram shown in FIG. 17 displays the icon images on the monthly basis, that is to say, the icon images are displayed based on the shooting month of which information is included in the additional information of the image-file data. The histogram is displayed, as at least two sets of icon images generated in association with the image-file data.

On the icon-list-display part C105, the user can move the image-selection cursor C106 by operating a scroll bar C107. Then, the user specifies a predetermined icon image so that details on the image-file data are displayed.

In FIG. 18, first, the user specifies the information "year 2005" as the year in which the shooting is performed, so as to narrow down image-data items for the list display. The icon images corresponding to the additional-information item "travel" are displayed in white and icon images that do not correspond to the additional-information item "travel" are displayed in gray.

Further, in FIG. 19, the icon images corresponding to the additional-information item "family" are displayed in red and icon images that do not correspond to the additional-information item "family" are displayed in gray.

By switching between the display patterns shown in FIGS. 17, 18, and 19, it becomes possible to easily select desired image data from among the massive image data while associating the hue information, the image-file data classified as "travel", and the image-file data classified as "family" with one another. Further, since the histogram displays the icon images on the shooting-monthly basis, information about the shooting date can be easily associated with the image data. Further, when the height of the displayed icon images is larger than that of the icon-list-display part C105, the scroll bar C107 is displayed on the icon-list-display part C105 so that the user can view all of the icon images by scrolling up and/or down on the icon-list-display part C105.

Although the image data is stored in the memory card in the above-described embodiments, the image data may be stored in other external storage mediums including a universal serial bus (USB) memory or the like. If the image-display apparatus includes a storage medium storing image data, the image data may be stored in an internal-storage device.

Further, in the above-described embodiments, the additional-information-file data is read from the memory card. However, if the image-file data is provided as Exif-file data, the additional-information-file data may not be necessary. In that case, since information about the shooting date or the like can be obtained by referring to attribute information stored in the header part of the Exif-file data, the obtained information may be used as the additional information.

The advantages of the present invention can be obtained even though the display-control device clarified in the above-described embodiments is provided in a printer including a print unit which prints an image on a print sheet. Likewise, the display-control device may be provided in an image-pickup-apparatus including an image-pickup unit configured to pick up image data.

Further, the display-control device clarified in the above-described embodiments may include a display part displaying images and/or an operation unit operated by the user. Namely, the display-control device may be a device to which the user transmits an instruction from outside so that the instruction is displayed on an external monitor. In that case, an object of the present invention can be achieved by supplying a storage medium storing program code implementing the functions of the above-described embodiments to a system and/or the device so that a computer (or a central-processing unit (CPU) or a microprocessing unit (MPU)) of the system and/or the device executes the program code. In that case, the program code read from the storage medium implements the functions of the above-described embodiments, and the storage medium storing the program code constitutes another embodiment of the present invention. The storage medium provided to supply the program code may be a hard disk, a compact disk (CD)-read only memory (ROM), a CD-recordable (R), a nonvolatile memory card, a ROM, a digital-versatile disk (DVD), and so forth.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-309705 filed on Nov. 30, 2007, which is hereby incorporated by reference herein in its entirety.

What is claimed is:

1. A display control apparatus comprising:
an inputting unit configured to input a designation by a user for designating an attribute of an image;
a specifying unit configured to specify at least one image having the attribute designated by the designation input by the inputting unit, from a plurality of images; and
a display control unit configured to cause a display apparatus to display a display screen in which both first information indicating the at least one image specified by the specifying unit and second information indicating at least one image not specified by the specifying unit are displayed concurrently, so that a first screen is displayed as the display screen, and then, if an instruction by a user is not input after the first screen is displayed for a predetermined time, a second screen is displayed as the display screen,
wherein in the first screen, the first information is displayed so as to be emphasized more than the second information, and in the second screen, a display position of the first information and the second information in the first screen is maintained and the first information and the second information are not emphasized with respect to each other.

2. The display control apparatus according to claim 1, wherein in a case where the inputting unit inputs a designation for designating a plurality of attributes, the specifying unit specifies at least one image corresponding to each of the plurality of attributes, and information indicating the at least one image specified by the specifying unit is the first information.

3. The display control apparatus according to claim 2, wherein the display control unit causes the display apparatus to display the first screen in which the information indicates the at least one image by changing an object to be emphasized for the plurality of attributes in turn every predetermined time.

4. The display control apparatus according to claim 2, wherein the specifying unit specifies at least one image corresponding to a first attribute and at least one image corresponding to a second attribute, and the first information indicates the at least one image specified by the first attribute and the second information indicates the at least one image specified by the second attribute.

5. The display control apparatus according to claim 1, wherein the display control unit is configured to cause the display apparatus to display the display screen in which a plurality of icons corresponding to the plurality of images are displayed as the first information and the second information.

6. The display control apparatus according to claim 5, wherein each of the plurality of icons has a color corresponding to an attribute of the plurality of images.

7. The display control apparatus according to claim 1, wherein the display control unit causes the display apparatus to display the display screen, so that the second screen is displayed, and then, if an instruction by a user is not input after the second screen is displayed for a predetermined time, the first screen is displayed.

8. The display control apparatus according to claim 7, wherein in the first screen displayed after the second screen, the first information corresponds to another attribute different from the attribute of the first screen displayed before the second screen is displayed.

9. The display control apparatus according to claim 1, further comprising a second display control unit configured to cause the display apparatus to display information corresponding to a plurality of attributes of the plurality of images;
wherein the inputting unit inputs the designation for designating an attribute selected by a user from the plurality of attributes based on the displaying by the second display control unit.

10. The display control apparatus according to claim 1, wherein in a case where images among the plurality of images have the attribute designated by the designation, the display control unit causes the display apparatus to display the images as the first information, so that the images are emphasized more than at least one image which does not have the attribute.

11. The display control apparatus according to claim 1, wherein the attribute designated by the designation input by the inputting unit is an attribute corresponding to a device which generates an image, an attribute corresponding to a date on which an image is generated, or an attribute corresponding to a content of an image.

12. The display control apparatus according to claim 1, wherein the display control unit is configured to cause the display apparatus to display the first screen, by processing the first information for emphasizing the first information more than the second information.

13. The display control apparatus according to claim 1, wherein the display control unit is configured to cause the display apparatus to display the first screen, by processing the second information for emphasizing the first information more than the second information.

14. The display control apparatus according to claim 1, wherein the first information is at least one thumbnail image indicating the at least one image specified by the specifying unit and the second information is at least one thumbnail image indicating at least one image not specified by the specifying unit.

15. A display control method comprising:
- inputting a designation by a user for designating an attribute of an image;
- specifying at least one image having the designated attribute from a plurality of images; and
- causing a display apparatus to display a display screen in which both first information indicating the at least one image specified and second information indicating at least one image not specified are display concurrently, so that a first screen is displayed as the display screen, and then, if an instruction by a user is not input after the first screen is displayed for a predetermined time, a second screen is displayed as the display screen,
- wherein in the first screen, the first information is displayed so as to be emphasized more than the second information, and in the second screen, a display position of the first information and the second information in the first screen is maintained and the first information and the second information are not emphasized with respect to each other.

16. The display control method according to claim 15, further comprising causing the display apparatus to display the display screen, so that the second screen is displayed, and then, if an instruction by a user is not input after the second screen is displayed for a predetermined time, the first screen is displayed.

17. The display control method according to claim 16, wherein in the first screen displayed after the second screen, the first information corresponds to another attribute different from the attribute of the first screen displayed before the second screen is displayed.

18. The display control method according to claim 15, further comprising, in a case where a designation is input for designating a plurality of attributes, at least one image is specified corresponding to each of the plurality of attributes, and information indicating the at least one specified image is the first information.

19. The display control method according to claim 18, further comprising causing the display apparatus to display the first screen in which the information indicates the at least one image by changing an object to be emphasized for the plurality of attributes in turn every predetermined time.

20. The display control method according to claim 15, further comprising causing the display apparatus to display the display screen in which a plurality of icons corresponding to the plurality of images are displayed as the first information and the second information.

21. The display control method according to claim 20, wherein each of the plurality of icons has a color corresponding to an attribute of the plurality of images.

22. The display control method according to claim 15, further comprising:
- causing the display apparatus to display information corresponding to a plurality of attributes of the plurality of images; and
- inputting the designation for designating an attribute selected by a user from the plurality of attributes based on the display of information corresponding to the plurality of attributes of the plurality of images.

23. A non-transitory computer-readable recording medium storing a program making a computer execute a method comprising:
- inputting a designation by a user for designating an attribute of an image;
- specifying at least one image having the designated attribute from a plurality of images; and
- causing a display apparatus to display a display screen in which both first information indicating the at least one image specified and second information indicating at least one image not specified are displayed concurrently, so that a first screen is displayed as the display screen, and then, if an instruction by a user is not input after the first screen is displayed for a predetermined time, a second screen is displayed as the display screen,
- wherein in the first screen, the first information is displayed so as to be emphasized more than the second information, and in the second screen, a display position of the first information and the second information in the first screen is maintained and the first information and the second information are not emphasized with respect to each other.

* * * * *